(12) United States Patent
Milne

(10) Patent No.: US 8,645,850 B1
(45) Date of Patent: Feb. 4, 2014

(54) METHODS AND APPARATUS FOR FLEXIBILITY INFERENCE IN TWO-DIMENSIONAL LAYOUT SYSTEMS

(75) Inventor: Philip Milne, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/566,792

(22) Filed: Aug. 3, 2012

Related U.S. Application Data

(60) Provisional application No. 61/541,853, filed on Sep. 30, 2011.

(51) Int. Cl.
*G06F 17/00* (2006.01)
*G06F 3/00* (2006.01)
*G06F 3/048* (2013.01)

(52) U.S. Cl.
USPC ........... 715/762; 715/227; 715/234; 715/243; 715/245; 715/246; 715/253; 715/788; 715/815

(58) Field of Classification Search
USPC ......... 715/227, 234, 788, 505, 506, 507, 508, 715/526, 780, 800, 801, 762, 764, 781, 243, 715/245, 246, 253, 815, 967; 345/619, 680; 716/102, 108, 112, 119, 123, 124, 135
See application file for complete search history.

(56) References Cited

U.S. PATENT DOCUMENTS

| | | | |
|---|---|---|---|
| 5,808,898 A | 9/1998 | Kajitani et al. | |
| 6,323,879 B1 | 11/2001 | Sauerbrei | |
| 6,594,806 B1 | 7/2003 | Casavant | |
| 6,873,187 B1 | 3/2005 | Andrews et al. | |
| 7,233,341 B1 | 6/2007 | Sauerbrei | |
| 7,707,508 B1 | 4/2010 | Moskalonek et al. | |

(Continued)

FOREIGN PATENT DOCUMENTS

| | | |
|---|---|---|
| WO | 2013/049537 | 4/2013 |
| WO | 2013/049544 | 4/2013 |
| WO | 2013/049556 | 4/2013 |

OTHER PUBLICATIONS

"Sams Teach Yourself Web Publishing with HTML and CSS in One Hour a Day" publised in 2007 Author: Lemay L., Colburn R. 1. Aligning Your Table Content, http://flylib.com/books/en/2.631.1.89/1/ 2. Sizing Tables, Borders, and Cells, http://flylib.com/books/en/2.631.1.87/1/.*

(Continued)

*Primary Examiner* — Alvin Tan
*Assistant Examiner* — Rinna Yi
(74) *Attorney, Agent, or Firm* — McDonnell Boehnen Hulbert & Berghoff LLP

(57) ABSTRACT

A layout that specifies rectangular components within a container rectangle may be specified. Each rectangular component has at least one size and a gravity parameter, and can be classified as flexible or non-flexible based on the gravity parameter. The computing device determines a plurality of grid lines from the layout. Each rectangular component of the set of rectangular components is associated with at least two grid lines. The at least two grid lines are based on the at least one size of the rectangular component. The computing device generates a system of constraints, where each constraint is related to at least two grid lines of the plurality of grid lines. The computing device solves the system of constraints to determine a location for each grid line. The computing device generates a display of the rectangular components based on the locations of the grid lines.

30 Claims, 20 Drawing Sheets

(56) References Cited

U.S. PATENT DOCUMENTS

| | | | |
|---|---|---|---|
| 7,707,528 B1 | 4/2010 | White et al. | |
| 7,770,141 B2 | 8/2010 | Chang et al. | |
| 8,091,021 B2 | 1/2012 | Bargeron et al. | |
| 2002/0188632 A1* | 12/2002 | Su | 707/513 |
| 2003/0210268 A1* | 11/2003 | Kataoka et al. | 345/762 |
| 2005/0094206 A1 | 5/2005 | Tonisson | |
| 2006/0253796 A1 | 11/2006 | Wang et al. | |
| 2007/0266359 A1 | 11/2007 | Esbensen et al. | |
| 2009/0089689 A1 | 4/2009 | Clark et al. | |
| 2010/0188705 A1 | 7/2010 | Giannetti et al. | |
| 2011/0265055 A1 | 10/2011 | Gray et al. | |
| 2012/0124492 A1 | 5/2012 | Taron | |

OTHER PUBLICATIONS

JFormDesigner Swing GUI design made easy—GridBagLayout published on Jul. 16, 2010 http://web.archive.org/web/20100716222207/http://www.formdev.com/jformdesigner/doc/layouts/gridbag layout/.*

D. R. Musser et al, "3 Graph Algorithm Concepts", An Algorithm Concept Web, Musser and Osman (ed.), May 16, 2003, Rensselaer Polytechnic Institute, Computer Science Department.

Google Inc., "Linear Layout—Hello, Views Tutorial for Android Developers", Aug. 25, 2011, Google Inc.

Google Inc., "Relative Layout—Hello, Views Tutorial for Android Developers", Aug. 25, 2011, Google Inc.

N. Obata et al, "3.17 Bellman-Ford Algorithm", An Algorithm Concept Web, Musser and Osman (ed.), May 16, 2003, Rensselaer Polytechnic Institute, Computer Science Department.

Scvalex, "One Source Shortest Path: The Bellman-Ford Algorithm", Nov. 29, 2007, Computer Programming—Just Another Programming Weblog.

Apple Inc., "Cocoa Autolayout Release Notes", Jun. 6, 2011, Apple Inc.

The MGMT, "Laying out interfaces automatically with Corelayout Part 1", Yet Another Learn Cocoa With Me Blog, Aug. 7, 2011.

The MGMT, "Laying out interfaces automatically with Corelayout Part 2—Layout Format Language", Yet Another Learn Cocoa With Me Blog, Aug. 13, 2011.

Thomas,"Auto-layout in Lion", Sep. 2, 2011, Gentle Bytes.

J. Fakcharoenphol, "Planar graphs, negative weight edges, shortest paths, and near linear time", Journal of Computer and System Sciences, Aug. 1, 2006, p. 868-889, vol. 72, No. 5, Academic Press, Inc., London, GB.

International Searching Authority, "Invitation to Pay Additional Fees and, Where Applicable, Protest Fee" for International Application No. PCT/US2012/057877 mailed Jan. 4, 2013.

International Searching Authority, "Invitation to Pay Additional Fees and, Where Applicable, Protest Fee" for International Application No. PCT/US2012/057892 mailed Jan. 4, 2013.

S. Lok et al., "A Survey of Automated Layout Techniques for Information Presentations", 1st International Symposium on Smart Graphics, Mar. 23, 2001, pp. 61-68, Hawthorne, NY.

Lutteroth et al., "Domain Specific High-Level Constraints for User Interface Layout", Constraints: An International Journal, Apr. 30, 2008, pp. 307-342, vol. 13, No. 3, Kluwer Academic Publishers.

Lutteroth et al., "End-user GUI Customization", CHINZ '08 Proceedings of the 9th ACM SIGCHI New Zealand Chapter's International Conference on Human-Computer Interaction: Design Centered HCI, Jul. 2, 2008, pp. 1-8, Association for Computing Machinery, New York, NY.

V.C. Schoch, "A GUI-based Interaction Concept for Effficient Slide Layout", Think-Cell Technical Report TC2003/01, Mar. 1, 2003, pp. 1-94.

International Searching Authority,"International Search Report and Written Opinion of International Searching Authority", PCT App. No. PCT/US2012/057877, mailed Mar. 5, 2013.

R. S. Latham et al., "Connectivity Analysis: a Tool for Processing Geometric Constraints", Computer-Aided Design, Nov. 1996, pp. 917-928, vol. 28, No. 11., Elsevier Science, Ltd.

C. Lutteroth et al.,"User Interface Layout with Ordinal and Linear Constraints", Proceedings of the 7th Australasian User Interface Conference (AUIC '06), Jan. 16-19, 2006, pp. 53-60, vol. 50, Australian Computer Society, Inc., Darlinghurst, Australia.

P. Milne, U.S. Appl. No. 13/566,749, filed Aug. 3, 2012.
P. Milne, U.S. Appl. No. 13/566,768, filed Aug. 3, 2012.
P. Milne et al., U.S. Appl. No. 13/566,820, filed Aug. 3, 2012.
P. Milne et al., U.S. Appl. No. 13/566,840, filed Aug. 3, 2012.
P. Milne, U.S. Appl. No. 13/566,859, filed Aug. 3, 2012.
P. Milne, U.S. Appl. No. 13/566,878, filed Aug. 3, 2012.
P. Milne, U.S. Appl. No. 13/566,895, filed Aug. 3, 2012.

A. Scoditti et al.,"A New Layout Method for Graphical User Interfaces", Proceedings of the 2009 IEEE Toronto International Conference for Science and Technology for Humanity (TIC-STH), Sep. 26, 2009, pp. 642-647, IEEE.

\* cited by examiner

METHODS AND APPARATUS FOR FLEXIBILITY INFERENCE IN TWO-DIMENSIONAL LAYOUT SYSTEMS

CROSS REFERENCE TO RELATED APPLICATIONS

This application claims priority to U.S. Patent App. No. 61/541,853, entitled "Apparatus and Methods for Efficient Layout of Components on a User-Interface", filed Sep. 30, 2011, the content of which is fully incorporated by reference herein for all purposes.

BACKGROUND

Many modern computer applications operating on computing devices provide a graphical user-interface for user interaction. Operating systems, which control computing devices, frequently provide some type of support to the applications to aid in designing user-interfaces to permit a common look and feel for applications utilizing the operating system.

An example tool provided by operating systems to applications to help design user-interfaces is a "layout manager" configured to receive a "layout", or series of instructions for dividing one or more relatively-large rectangles available for the user-interface into a set of smaller rectangles that can be separated by space. The relatively-large rectangle(s) are typically referred to as "containers" and the smaller rectangles are typically referred to as "components." Typically, the layout manager implements a layout strategy associated with the containers.

SUMMARY

In a first aspect, a computing device receives a layout configured to specify at least a set of rectangular components within a container rectangle. Each rectangular component has at least one size in at least one dimension. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints, with each constraint of the system of constraints is related to at least two grid lines of the plurality of grid lines. The computing device solves the system of constraints to determine, for each grid line in the plurality of grid lines, a location for the grid line. The computing device generates a display of at least some of the set of rectangular components based on the locations of the grid lines.

In a second aspect, a computing device receives a user-interface layout configured to specify at least a first rectangular component and a second rectangular component, both within a container rectangle. The first rectangular component has a first size in a horizontal or vertical dimension. The second rectangular component has a second size in the horizontal or vertical dimension. The computing device determines a plurality of grid lines based on the user-interface layout. The first rectangular component is associated with a first set of at least two grid lines of the plurality of grid lines and the second rectangular component is associated with a second set of at least two grid lines of the plurality of grid lines. The computing device can generate a system of constraints, where a first constraint in the system of constraints is related to the first set of at least two grid lines, and where a second constraint in the system of constraints is related to the second set of at least two grid lines. The computing device solves the system of constraints to determine, for each respective grid line in the first and second sets of grid lines, a respective location for the respective grid line. The computing device can generate a user-interface display including the first and second rectangular components based on the respective locations of the respective grid lines. The computing device can display the user interface display.

In a third aspect, a computing device receives a layout configured to specify at least a set of rectangular components within a container rectangle. Each rectangular component has at least one size in at least one dimension. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints, with each constraint of the system of constraints is related to at least two grid lines of the plurality of grid lines. The computing device generates a graph including a plurality of nodes and a plurality of edges. Each node is associated with a node value. The plurality of nodes corresponds to the plurality of grid lines and the plurality of edges corresponds to the system of constraints. The computing device topologically sorts the plurality of edges.

The computing device determines locations for the grid lines by solving a single-source path-length problem for the graph using a variant of the Bellman-Ford algorithm configured to operate with the topologically-sorted plurality of edges. The computing device generates a display of at least some of the set of rectangular components based on the locations of the grid lines.

In a fourth aspect, a computing device receives a layout configured to specify at least a set of rectangular components within a container rectangle with each rectangular component of the set of rectangular components having at least one size in at least one dimension. The set of rectangular components includes a space component configured to be non-visible and configured not to react to user-interface events. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints, with each constraint of the system of constraints relates to at least two grid lines of the plurality of grid lines, The computing device solves the system of constraints to determine, for each grid line in the plurality of grid lines, a location for the grid line. The computing device generates a display of at least some of the set of rectangular components based on the locations of the grid lines.

In a fifth aspect, a computing device receives a layout configured to specify at least a set of rectangular components within a container rectangle. Each rectangular component of the set of rectangular components has at least one size in at least one dimension. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints including one or more normal-order constraints. Each constraint of the system of constraints is related to at least two grid lines of the plurality of grid lines. The one or more normal-order constraints specify a normal order for the plurality of grid lines. The computing device solves the system of constraints to determine, for each grid line of the plurality of grid lines, a first location of the grid line. The computing device identifies at least one relaxable normal-order constraint of the one or more normal-order constraints. The computing device solves the system of constraints based on relaxing the at least one relaxable normal-order constraint to determine, for each grid line in the plurality of grid lines, a second location for the grid line. The second location differs from the first location for at least one relaxed grid line in the plurality of grid lines. The computing device generates a display of at least some of the set of rectangular components based on the second locations of the grid lines. The computing device displays the display.

In a sixth aspect, a layout is received at a computing device. The layout is configured to specify a set of rectangular components within a container rectangle. Each rectangular component has at least one size in at least one dimension and is configured with a gravity parameter. Each rectangular component is classified as flexible or non-flexible based on the gravity parameter for the rectangular component. The computing device can determine a plurality of grid lines from the layout. Each rectangular component of the set of rectangular components is associated with at least two grid lines of the plurality of grid lines. The at least two grid lines are based on the at least one size of the rectangular component. The computing device can generate a system of constraints, where each constraint of the system of constraints is related to at least two grid lines of the plurality of grid lines. The computing device can solve the system of constraints to determine, for each grid line in the plurality of grid lines, a location for the grid line. The computing device can generate a display of at least some of the set of rectangular components based on the locations of the grid lines.

In a seventh aspect, a computing device receives a layout configured to specify at least a set of rectangular components within a container rectangle. Each rectangular component of the set of rectangular components has at least one size in at least one dimension. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints including a minimum constraint and a maximum constraint. Each constraint of the system of constraints is related to at least two grid lines of the plurality of grid lines. The minimum constraint specifies a minimum value between at least two grid lines. The maximum constraint specifies a maximum value between at least two grid lines. The computing device solves the system of constraints to determine, for each grid line of the plurality of grid lines, a location of the grid line. The computing device generates a display of at least some of the set of rectangular components based on the locations of the grid lines.

In an eighth aspect, a computing device receives a layout configured to specify at least a set of rectangular components within a container rectangle. Each rectangular component of the set of rectangular components has at least one size in at least one dimension. The computing device determines a plurality of grid lines from the layout. Each rectangular component of the set of rectangular components is associated with at least two grid lines of the plurality of grid lines. The at least two grid lines are based on the at least one size of the rectangular component. The computing device generates a system of constraints. Each constraint of the system of constraints is related to at least two grid lines of the plurality of grid lines.

The system of constraints includes inconsistent constraints. A graph with a plurality of nodes and a plurality of edges is generated. Each node is associated with a node value. The plurality of nodes corresponds to the plurality of grid lines. The plurality of edges corresponds to the system of constraints. The computing device solves the system of constraints to determine locations for the grid lines using a variant of the Bellman-Ford algorithm configured to operate with the inconsistent constraints. The computing device generates a display of at least some of the set of rectangular components based on the locations of the grid lines.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Overview

Figure 1:
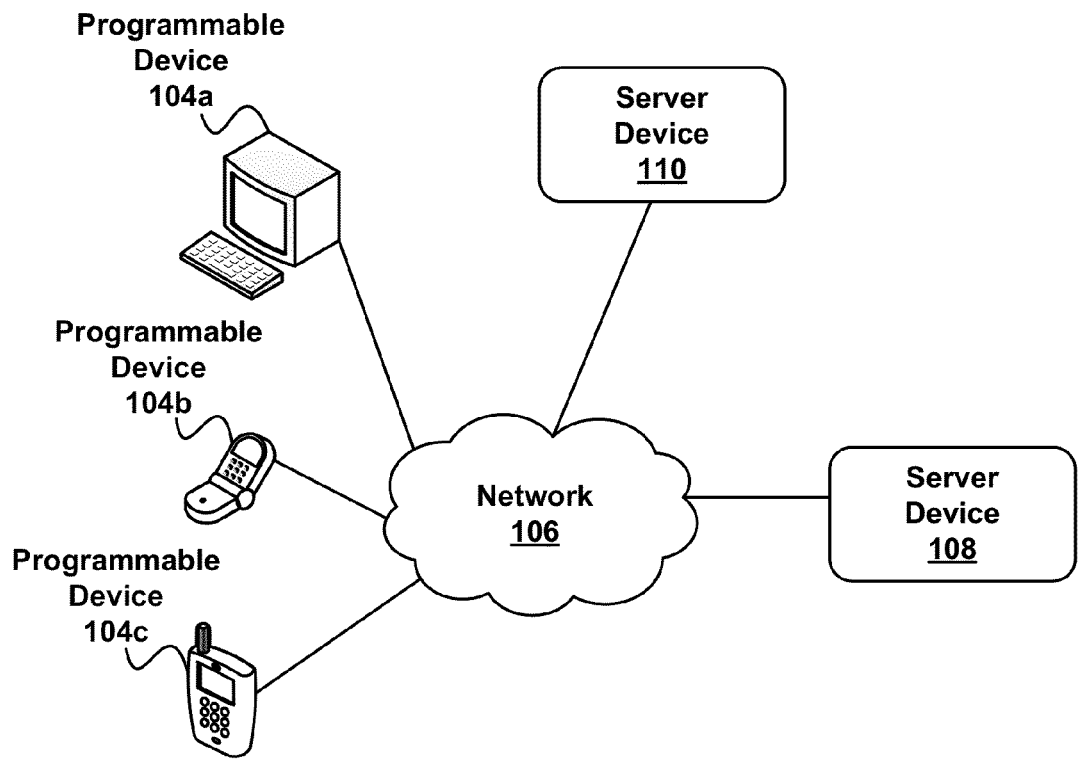
FIG. 1 depicts a distributed computing architecture in accordance with an example embodiment.

As the types of devices that support computing applications increase in variety, the challenges of designing a flexible layout manager that can support these devices increases accordingly. For example, it may be desirable for a software application to be able to operate properly on diverse types of mobile phones, tablet computers, and/or digital televisions.

However, the display sizes and display resolutions (e.g., pixel densities) supported by these devices can vary dramatically. A mobile phone might have a display resolution from as little as 208×208 or less to as much as 960×640 or more (here, a display resolution of m×n generally refers to a display screen on the device supporting m pixels in the horizontal direction and n pixels in the vertical direction). A tablet computer might support a display resolution from as little as 768×480 or less to 1280×1024 or more. Modern high-definition digital televisions support many display resolutions, some exceeding 1920×1080.

As a result of this great diversity in display resolution, it can be challenging to facilitate application user-interface layouts that have a consistent format across even a subset of all possible devices. Particularly challenging is designing a layout manager that can support properly displaying user-interface layouts on devices with smaller screen resolutions.

In some layout managers, designing a layout strategy involves specification and subsequent determination of (i) horizontal and/or vertical alignments within a component, and (ii) fixed or changeable "flexibility" of the components within the container. The flexibility of a component may be used to indicate the degree to which the size of the component, in at least one dimension, can be adjusted in order to fit the component within a display of components. The layout manager may then gather the sizing, alignment, and flexibility requirements of each component within a container rectangle to produce a user-interface based on the locations and sizes for those components. Then, the application can utilize the laid-out user-interface to permit a user to interact with the rest of the application.

This disclosure relates to generating user-interface displays based on solving a series of constraints specified by a layout for one or more rectangular components within a container rectangle. The layout may logically divide the container rectangle into rows and columns along which the contained rectangular components are arranged. Generally speaking, the components can be defined to occupy more than one row and/or more than one column of a container rectangle, as long as the rows and columns are contiguous. The specification of such components is normally indicated in terms of a starting row or column index and a span—the vertical axis being specified with a row index and a row span and the horizontal axis specified with a column index and a column span.

A "cell group" is defined as a set of cells that are delimited by start and end indices along both X and Y axes: four numbers in all. For example, if a component is desired that occupies an entire top row of a user-interface split into 5 columns and 5 rows, the cell group for the top row can be specified within a layout using the following four numbers:

rowStart=0
rowEnd=1
columnStart=0
columnEnd=5

In the disclosed layout system, these numbers can identify "grid lines" that separate the container rectangle into rows and columns. The rows and columns can be specified in terms of a start index and a span or a pair of start and end indices. For example, when defining four columns within the container, the grid lines defining the four columns can be called $X0, X1, X2, X3$ and $X4$. Similarly, grid lines defining four rows can be labeled $Y0, Y1, Y2, Y3$, and $Y4$. Both components and the container rectangle can also be defined using these labels; e.g., the container rectangle has columns spanning from $X0$ to $X4$ and rows spanning from $Y0$ to $Y4$.

The indices that label the grid lines for the columns may appear in the viewing area in the "normal order"; i.e.: $X0 \rightarrow X1 \rightarrow X2 \rightarrow X3 \rightarrow X4$. The corresponding normal order condition for the rows is that $Y0 \rightarrow Y1 \rightarrow Y2 \rightarrow Y3 \rightarrow Y4$. However, dropping the normal order condition for some components can allow grid lines to move freely over part or all of the space governed by the container rectangle and create a significantly more powerful system. It creates the possibility of having negative row heights and/or column widths. For example, specifying negative row heights and/or column widths for non-visible components can enable the layout system to find a layout solution that better fits its contents.

The specification of components and the container rectangle using grid lines permits conversion to a series of constraints for specifying pixel positions for the grid lines. For example, if a component is specified in the x-dimension by grid lines $X1$ to $X3$ and has to be exactly 200 pixels wide, a corresponding constraint is specified in the x-dimension for this component is $X3-X1=200$. If the component is specified in the y-dimension by grid lines $Y2$ and $Y3$ and has to be between 150 and 200 pixels high, two corresponding constraints can be used to specify the row condition: $Y2-Y3 \geq -200$ and $Y3-Y2 \geq 150$.

In some embodiments, components and containers having one dimension or more than two dimensions can be specified. In each dimension, though, one pair of numbers can be used define a starting position and an ending position within the dimension; thus, to specify a component of N dimensions, 2N numbers can be used.

The set of constraints can then be solved using linear programming or other algorithms. In one embodiment, the set of constraints can be converted into a corresponding graph. A "single-source path-length problem" can be solved for the graph to determine locations for each of the grid lines relative to a source grid line. Examples of the single-source path-length problem include a "single-source shortest-path problem" to find shortest paths between a single source node and the other nodes in the graph and a "single-source longest-path problem" to find longest paths between the single source node and the other nodes in the graph. The layout system can use these locations to specify locations of the grid lines within the container rectangle, and generate a display of at least some of the components within the container rectangle using the located grid lines.

One algorithm for solving the single-source path-length problem is the Bellman-Ford algorithm. In one aspect of the disclosure, an implementation of a Bellman-Ford algorithm variant disclosed herein can solve a single-source path-length problem with an average run time on $O(|E|)$, where $|E|$=the number of arcs (edges) in the graph corresponding to the set of constraints. In some particular aspects, the graph can be a directed graph. In other particular aspects, arcs in the graph representing invalid constraints can be identified and removed by the implementation of the Bellman-Ford algorithm variant disclosed herein.

The layout system accepts simplified specifications of layouts that do not require explicit specification of flexibility constants. (As noted above, the flexibility of a component indicates how much the size of the component, in at least one dimension, can be adjusted in order to fit the component in a display of components.) In declarative systems and conventional objected oriented systems the user typically has the option not to declare the gravity at all. The disclosed system can utilize the undefined state to infer the flexibility of the component within a row or column. If a horizontal or vertical alignment was defined for a component, then the flexibility for the component can be considered to be flexible as it is already defined what should happen to the extra space. In the case where "gravity," or horizontal/vertical alignment, is not explicitly defined, the system can infer the opposite: that the cell's size is fixed by the size of the component, such a text, a button, a display, etc. that it contains and thus is non-flexible. In another case, where no sizes are specified for a given component such as a herein-described Space component, the given component can be considered to be flexible.

To further infer the flexibility of the rows and columns even when they contain multiple components the following two reduction rules may be deployed:

Rule 1: Elements in parallel (e.g., aligned in a column) are flexible if all of the parallel elements are flexible.

Rule 2: Elements in series (e.g., in a row) are flexible if one of the series elements is flexible. By removing explicit specification of flexibility, the layout manager simplifies the specification of layouts by user-interface designers and tools.

The layout manager permits relaxation of the normal order condition of rows and columns for grid lines associated with non-visible components. Relaxation of the normal order condition can enable, in some instances, complete display of a user-interface even when the container rectangle is smaller than required under the normal order condition. Further, in embodiments disclosed herein, the layout manager utilizes efficient algorithms to operate quickly, enabling rapid resizing and redrawing operations of user-interfaces.

Example Data Network

Turning to the Figures, FIG. 1 shows server devices 108, 110 configured to communicate, via network 106, with programmable devices 104a, 104b, and 104c. Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three programmable devices, distributed application architectures may serve tens, hundreds, or thousands of programmable devices. Moreover, programmable devices 104a, 104b, and 104c (or any additional programmable devices) may be any sort of computing device, such as an ordinary laptop computer, desktop computer, network terminal, wireless communication device (e.g., a cell phone or smart phone), and so on. In some embodiments, programmable devices 104a, 104b, and 104c may be dedicated to the design and use of software applications. In other embodiments, programmable devices 104a, 104b, and 104c may be general purpose computers that are configured to perform a number of tasks and need not be dedicated to software development tools.

Server devices 108, 110 can be configured to perform one or more services, as requested by programmable devices 104a, 104b, and/or 104c. For example, server device 108 and/or 110 can provide content to programmable devices 104a-104c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 108 and/or 110 can provide programmable devices 104a-104c with access to software for database, search, computation, graphical, audio, video, World Wide Web/Internet utilization, and/or other functions. Many other examples of server devices are possible as well.

Computing Device Architecture

Figure 2A:
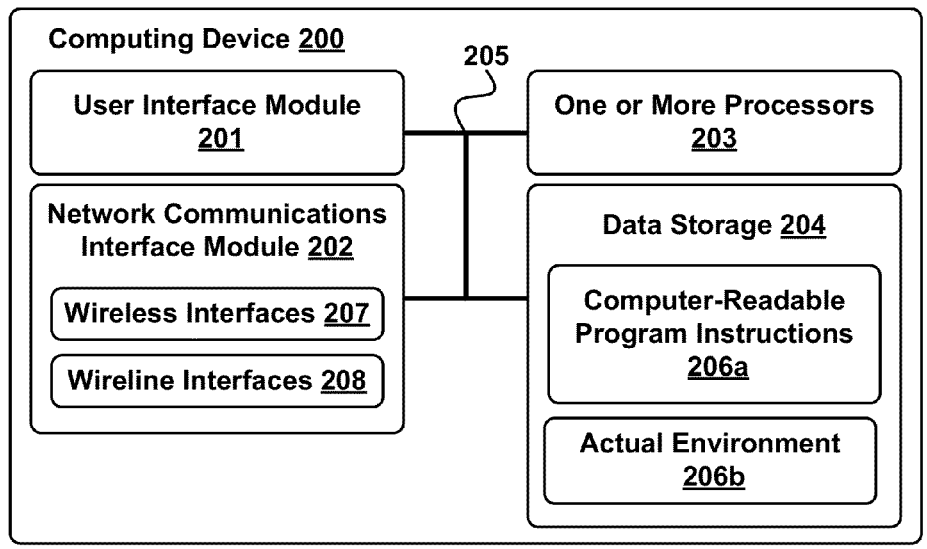
FIG. 2A is a block diagram of a computing device in accordance with an example embodiment.

FIG. 2A is a block diagram of a computing device (e.g., system) in accordance with an example embodiment. In particular, computing device 200 shown in FIG. 2A can be configured to perform one or more functions of server devices 108, 110, network 106, and/or one or more of programmable devices 104a, 104b, and 104c. Computing device 200 may include a user-interface module 201, a network-communication interface module 202, one or more processors 203, and data storage 204, all of which may be linked together via a system bus, network, or other connection mechanism 205.

User-interface module 201 can be operable to send data to and/or receive data from external user input/output devices. For example, user-interface module 201 can be configured to send and/or receive data to and/or from user input devices such as a keyboard, a keypad, a touch screen, a computer mouse, a track ball, a joystick, a camera, a voice recognition module, and/or other similar devices. User-interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User-interface module 201 can also be configured to generate audible output(s), such as a speaker, speaker jack, audio output port, audio output device, earphones, and/or other similar devices. In particular, computing device 200 with user-interface module 201 can be used to display a user-interface that includes one or more components within a container rectangle.

Network-communications interface module 202 can include one or more wireless interfaces 207 and/or one or more wireline interfaces 208 that are configurable to communicate via a network, such as network 106 shown in FIG. 1. Wireless interfaces 207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 203 can include one or more general purpose processors and/or one or more special purpose processors (e.g., digital signal processors, application specific integrated circuits, etc.). Processors 203 can be configured to execute computer-readable program instructions 206a that are contained in the data storage 204 and/or other instructions as described herein.

Data storage 204 can include one or more computer-readable storage media that can be read and/or accessed by at least one of processors 203. The one or more computer-readable storage media can include volatile and/or non-volatile storage components, such as optical, magnetic, organic or other memory or disc storage, which can be integrated in whole or in part with at least one of processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206a, actual environment 206b, and perhaps additional data. Actual environment 206b can store at least some of the data used by one or more processes and/or threads of a software application. In some embodiments, data storage 204 can additionally include storage required to perform at least part of the herein-described methods and techniques and/or at least part of the functionality of the herein-described devices and networks.

Cloud-Based Servers

Figure 2B:
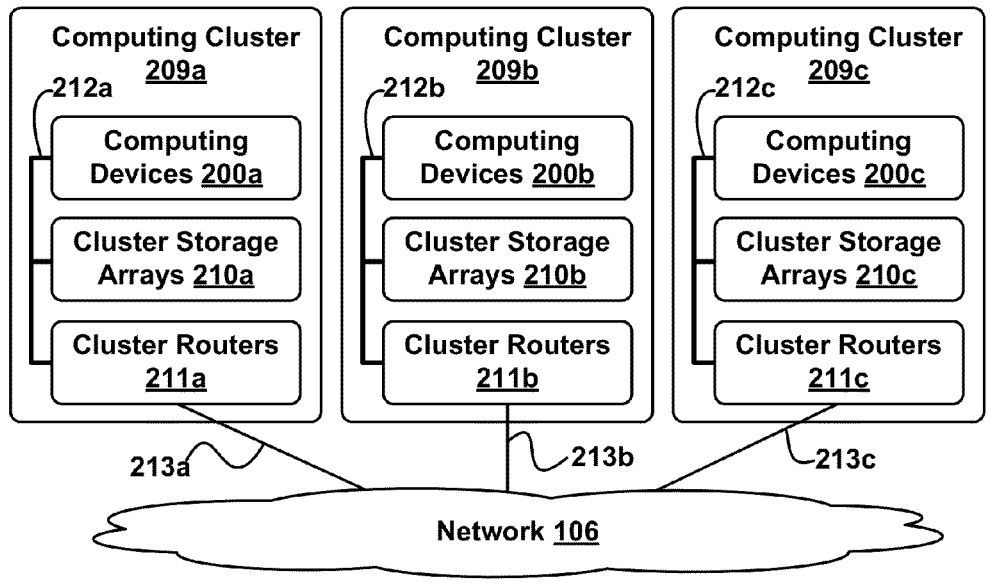
FIG. 2B depicts a cloud-based server system in accordance with an example embodiment.

FIG. 2B depicts a network 106 of computing clusters 209a, 209b, 209c arranged as a cloud-based server system in accordance with an example embodiment. Server devices 108 and/or 110 can be cloud-based devices that store program logic and/or data of cloud-based applications and/or services. In some embodiments, server devices 108 and/or 110 can be a single computing device residing in a single computing center. In other embodiments, server device 108 and/or 110 can include multiple computing devices in a single computing center, or even multiple computing devices located in multiple computing centers located in diverse geographic locations. For example, FIG. 1 depicts each of server devices 108 and 110 residing in different physical locations.

In some embodiments, data and services at server devices 108 and/or 110 can be encoded as computer readable information stored in tangible computer readable media (or computer readable storage media) and accessible by programmable devices 104a, 104b, and 104c, and/or other computing devices. In some embodiments, data at server device 108 and/or 110 can be stored on a single disk drive or other tangible storage media, or can be implemented on multiple disk drives or other tangible storage media located at one or more diverse geographic locations.

FIG. 2B depicts a cloud-based server system in accordance with an example embodiment. In FIG. 2B, the functions of server device 108 and/or 110 can be distributed among three computing clusters 209a, 209b, and 209c. Computing cluster 209a can include one or more computing devices 200a, cluster storage arrays 210a, and cluster routers 211a connected by a local cluster network 212a. Similarly, computing cluster 209b can include one or more computing devices 200b, cluster storage arrays 210b, and cluster routers 211b connected by a local cluster network 212b. Likewise, computing cluster 209c can include one or more computing devices 200c, cluster storage arrays 210c, and cluster routers 211c connected by a local cluster network 212c.

In some embodiments, each of the computing clusters 209a, 209b, and 209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of electronic communications server 112. In one embodiment, the various functionalities of electronic communications server 112 can be distributed among one or more of computing devices 200a, 200b, and 200c. Computing devices 200b and 200c in computing clusters 209b and 209c can be configured similarly to computing devices 200a in computing cluster 209a. On the other hand, in some embodiments, computing devices 200a, 200b, and 200c can be configured to perform different functions.

In some embodiments, computing tasks and stored data associated with server devices 108 and/or 110 can be distributed across computing devices 200a, 200b, and 200c based at least in part on the processing requirements of server devices 108 and/or 110, the processing capabilities of computing devices 200a, 200b, and 200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 210a, 210b, and 210c of the computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 108 and/or 110 can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays can be configured to store the data of server device 108, while other cluster storage arrays can store data of server device 110. Additionally, some cluster storage arrays can be configured to store backup versions of data stored in other cluster storage arrays.

The cluster routers 211a, 211b, and 211c in computing clusters 209a, 209b, and 209c can include networking equipment configured to provide internal and external communications for the computing clusters. For example, the cluster routers 211a in computing cluster 209a can include one or more internet switching and routing devices configured to provide (i) local area network communications between the computing devices 200a and the cluster storage arrays 210a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that can contribute to the cost, speed, fault-tolerance, resiliency, efficiency and/or other design goals of the moderation system architecture.

Example Layout

Figure 3:
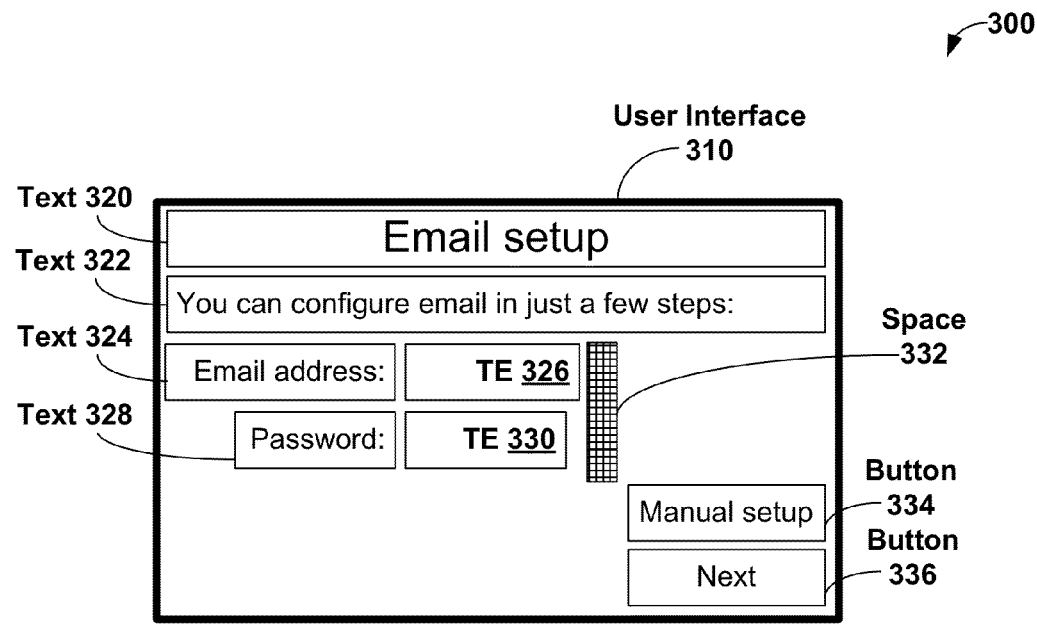
FIG. 3 shows a scenario with an example user-interface without and with grid lines, in accordance with an example embodiment.
Figure 3:
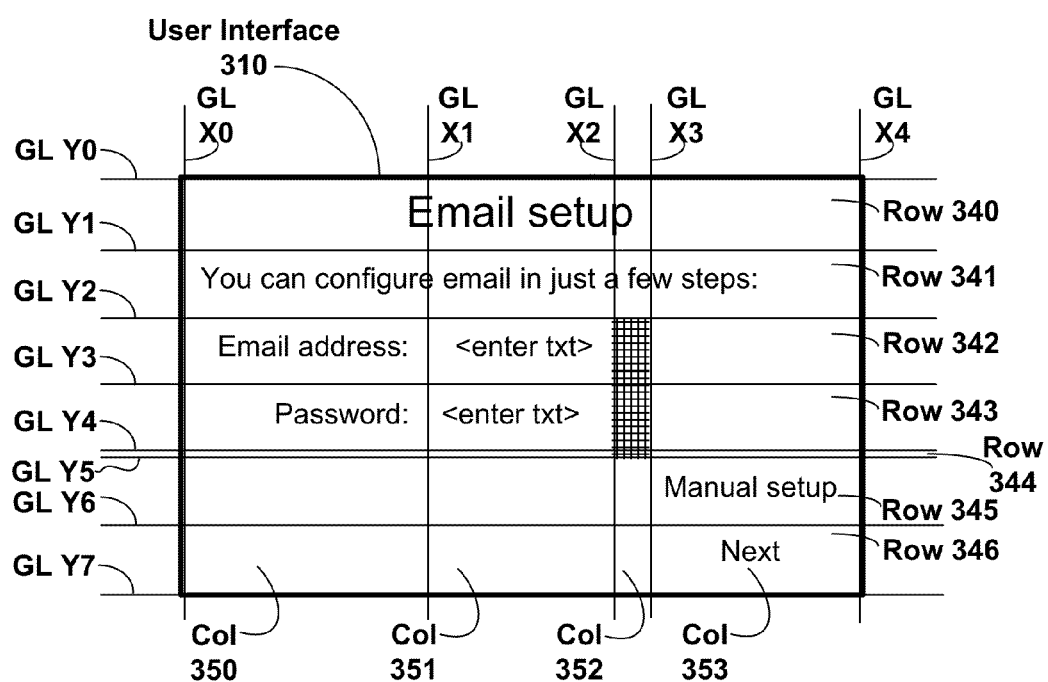

FIG. 3 depicts a scenario 300 regarding an example user-interface 310, in accordance with an embodiment. An example layout that defines user-interface 310 that can be displayed using a computing device, such as computing device 200, is shown in Table 1 below.

TABLE 1

```
<GridLayout
   xmlns : abc="http : // . . . /apk/res/abc"
   layout_width="match_parent"
   layout_height="match_parent"
   useDefaultMargins="true"
   alignmentMode="alignBounds"
   rowOrderPreserved="false"
   columnCount="4"
>
<TextView
   text="Email setup"
   textSize="32dip"
   layout_columnSpan="4"
   layout_gravity="center_horizontal"
/>
<TextView
   text="You can configure email in just a few steps:"
   textSize="16dip"
   layout_columnSpan="4"
   layout_gravity="left"
/>
<TextView
   text="Email address:"
   layout_gravity="right"
/>
<EditText
   ems="10"
/>
<TextView
   text="Password:"
   layout_column="0"
   layout_gravity="right"
/>
<EditText
   ems="8"
/>
<Space
   layout_row="2"
   layout_rowSpan="3"
   layout_column="2"
   layout_gravity="fill"
/>
<Button
   text="Manual setup"
   layout_row="5"
   layout_column="3"
/>
<Button
   text="Next"
   layout_column="3"
   layout_gravity="fill_horizontal"
/>
</GridLayout>
```

Table 1 is an eXtended Markup Language (XML) document that defines a layout called a "GridLayout". Generally, an XML document includes a root element and zero or more sub-elements of the root element. An XML root element or sub-element includes at least one tag, and may have a start tag, content, and an end tag. A start tag is of the form <tag [attrib1="value", [attrib2="value2" . . . ]>, where tag is the name of the XML (sub-) element, and attrib1 and attrib2 are optional attributes that modify and/or provide information about the XML (sub-) element. The content starts after the start tag. End tags delimit the end of the content and are typically denoted as </tag>.

The GridLayout root element can be used to define a user-interface that utilizes grid lines for placement of components within a grid rectangle. The GridLayout root element start and end tags of Table 1 are shown separately in Table 1.1 below.

TABLE 1.1

```
<GridLayout
   xmlns : abc="http : // . . . /apk/res/abc"
   layout_width="match_parent"
   layout_height="match_parent"
   useDefaultMargins="true"
   alignmentMode="alignBounds"
   rowOrderPreserved="false"
   columnCount="4"
>
. . .
</GridLayout>
```

As shown in Table 1.1, the GridLayout start tag specifies an XML namespace via a Uniform Resource Locator (URL), and a number of parameters. These parameters include parameters for specifying: layout width and height, default margins, an alignment mode, row order preservation, and a number of columns. The row order preservation parameter being set equal to "false" indicates that the layout manager is permitted, under certain conditions, to relax the normal order constraint for the rows of the layout. In the example of Tables 1 and 1.1, the number of columns is set to 4. In other embodiments, more or fewer parameters can be specified as part of the GridLayout element. The GridLayout end tag is shown on the last line of Table 1 and duplicated as the last line of Table 1.1.

Between the GridLayout start tag and end tag is the content, which defines the sub-elements of the GridLayout element. In the example shown in Table 1, the GridLayout root element has nine sub-elements: four TextView sub-elements, two EditText sub-elements, two Button sub-elements, and one Space sub-element. For simplification, Table 1.1 replaces these sub-elements with an ellipsis. In some examples, such as user-interface 310, the GridLayout element can be used to specify attributes of the container rectangle for the user-interface, while the sub-elements of the GridLayout element can be used to specify attributes of components of the user-interface.

A TextView sub-element can be used to specify text to be displayed in a user-interface, such as user-interface 310. The first TextView sub-element of the GridLayout element in Table 1 is shown separately in Table 1.2 below:

TABLE 1.2

```
<TextView
   text="Email setup"
   textSize="32dip"
   layout_columnSpan="4"
   layout_gravity="center_horizontal"
/>
```

As shown in Table 1.2, the TextView sub-element's tag can specify text, a text size, a column "span" or number of columns occupied by the TextView sub-element, and a "gravity" parameter. In this example, the text is "Email setup", the text size is 32 density-independent pixels (dip), and the number of columns in the column span is 4 as specified by the columnSpan parameter for this component. In other examples, a row and/or column number can be specified, a row span can be specified, and other units can be used for text sizes than dip-units; e.g., points of a font, pixels, ems, inches, centimeters, and/or other suitable units.

The gravity parameter governs placement of the component within a cell group. In the example of table 1.2, the gravity is "center_horizontal" indicating the text "Email setup" for this TextView sub-element is to be centered horizontally within the cell group. Other example horizontal gravity values include "top", "bottom", "fill_horizontal", which stretches the component to completely take up the space within the cell group, and "baseline," which aligns the text of the component along the "baseline." The baseline is the imaginary line upon which most letters in a given font "sit" and below which is used by the descending portions (e.g., the tail of the letter "p") of letters in a font. Using the example word "dog", the bottoms of the letters "d" and "o" and the top circle of the letter "g" are on the baseline, while the tail of the letter "g" descends below the baseline.

In some examples, vertical gravity values can be used instead of or in addition to horizontal gravity values. Example vertical gravity values include "left", "center_vertical", "right", and "fill_vertical." Also, horizontal and vertical gravity values can be specified together; e.g., specifying both layout_gravity="center_horizontal" for horizontal centering within the cell group, and layout_gravity="center_vertical" for vertical centering within the cell group, thereby centering the component both horizontally and vertically within the cell group.

A GridLayout element can be associated with a grid of rows and columns. The grid can be specified, at least in part, by the GridLayout element. In the example shown in Tables 1 and 1.1, the GridLayout element specifies that there are four columns in the grid using the columnCount parameter. Also, the sub-elements can specify part or the entire grid; for example, by specifying starting, spanning, and/or ending columns and rows.

An EditText sub-element can be used to permit text to be entered via a user-interface, such as user-interface 310. The first EditText sub-element of the GridLayout element in Table 1 is shown separately in Table 1.3 below:

TABLE 1.3

<EditText
   ems="10"
/>

The EditText sub-element shown in Table 1.3 has one parameter "ems" which specifies the size of a text-entry region for entering text. In this example, the text-entry region is 10 "ems" in size. Ems are units that define letters with respect to a point size of a particular font; e.g., the point size and font used for entering text into the text-entry region. In other examples, the size of the text-entry region can be provided in units other than "ems"; e.g., dip-units, pixels, points of a font, ems, inches, centimeters, and/or other suitable units.

A Space sub-element can be used to permit specification of a non-visible component of a user-interface, such as user-interface 310. In some embodiments, when rendered as part of the user-interface, the Space sub-element is transparent, does not react to user-interface events (e.g., clicks, taps, mouse-overs, pinch-gestures, etc.), and cannot have children. On the other hand, a non-Space component may react to some user-interface events. As such, an implementation of a component corresponding to the Space sub-element can consume fewer system resources than a non-Space component.

The Space sub-element of the GridLayout element in Table 1 is shown separately in Table 1.4 below:

TABLE 1.4

<Space
   layout_row="2"
   layout_rowSpan="3"
   layout_column="2"
   layout_gravity="fill"
/>

Because the Space component is a regular component, it may have properties specified as parameters, just as with non-Space components. The Space sub-element shown in Table 1.4 has four parameters: "layout_row" which specifies a starting row of the GridLayout grid for the Space component, "rowSpan" which specifies a number of rows of the GridLayout grid occupied by the Space component, "layout_column" which specifies a starting column of the GridLayout grid for the Space component, and a "layout_gravity" parameter whose value is "fill" to specify a vertical fill. Based on the specified starting row of 2 and the row span of 3, the Space component will occupy rows 2, 3, and 4, in column 2 of the user-interface.

By making widgets for Space components inherit from a common super-class as widgets for non-Space components, the Space component can acquire automatic support in existing layout strategies. For example, the Space component can be implemented as a subclass of the base class/common super-class for widgets used within the user-interface. Continuing this example, all components utilized by the layout manager could have a base class or common super-class of Component. The Component class can have methods and/or data related to all component widgets, such as data and/or methods for rows, row spans, columns, column spans, flexibility, gravity, and grid lines, with many other examples being possible as well.

The Component class can have sub-classes such as SpaceComponent for Space-component related widgets and VisibleComponent for non-Space-component related widgets with visible component methods and data. Example Space-component methods and data include text-related data/methods, graphical-object-related data/methods, button-related data/methods, Example visible component methods and data include text-related data/methods, graphical-object-related data/methods, button-related data/methods, with many other examples of sub-classes, methods, and data being possible as well.

Space components can unify the principle of space across multiple layout strategies. In particular, in a GridLayout, a Space component can be used to specify where space is inserted within a user-interface and how the space should behave when the container rectangle is resized.

Also, a Space component with a specified gravity, such as the Space component defined in Table 1.4, is a flexible component. As such, the size of the Space component can be altered as required by the layout manager. For example, suppose the Space component (or other flexible component) is within a container rectangle whose size exactly matches a display window used to display user-interface 310. Then, suppose the display window is resized by the user to either grow or shrink. In response to the display window being resized, the layout manager can adjust the size of flexible components, such as the Space component, so that user-interface 310 fits as best feasible within the resized display window. For example, one or more sizes of the Space component can be increased as the display window grows, or decreased as the display window shrinks.

In some embodiments, a Space component can be used to specify additional grid lines within the GridLayout. In some scenarios, the additional grid lines can violate the normal order condition, because they relate to a non-visible component. As such, the grid lines can permit overlapping rows and/or columns when a container rectangle is smaller than a pre-determined size. See user-interface 610a of FIG. 6B and the discussion below for an example of overlapping rows.

A Button sub-element can be used to specify a button for a user-interface, such as user-interface 310. The first Button sub-element of the GridLayout element in Table 1 is shown separately in Table 1.5 below:

TABLE 1.5

```
<Button
    text="Manual setup"
    layout_row="5"
    layout_column="3"
/>
```

The Button sub-element shown in Table 1.3 has three parameters: "text" of "Manual setup" which is text to be displayed on the button in user-interface 310, "layout_row" which specifies a starting row of the GridLayout grid for the Button sub-element, and "layout_column" which specifies a starting column of the GridLayout grid for the Button sub-element. Based on the specified "layout_row" and "layout_column", the Button component specified as specified in Table 1.5 will start at row 5, column 3 of user-interface 310.

In other examples, a GridLayout element can have more, fewer, and/or different sub-elements than shown in Tables 1 through 1.5. Correspondingly, in these other examples, user-interface 310 can have more, fewer, and/or different components than shown in FIG. 3. In other embodiments, GridLayouts can be specified using techniques other than XML.

FIG. 3 shows user-interface 310 with text 320 and 322, which corresponds respectively to the first and second TextView sub-elements of Table 1. As each TextView sub-element spans all four columns of user-interface 310, each sub-element is shown on a separate TOW.

Text 324 corresponds to the third TextView sub-element of Table 1—as this TextView sub-element does not include specification of a "columnSpan" parameter, the default column span of 1 column is used. Then, the next sub-element specified in Table 1—the first EditText sub-element of Table 1—is shown in FIG. 3 as text entry (TE) region 326 to the right of text 324.

Table 1 then specifies a fourth TextView sub-element, corresponding to text 328, which has a starting column of "0" as specified using the layout_column parameter and uses the default column span of 1 column. Thus, as text 328 begins in column 0, text 328 begins on a row below text 324. Then, the next sub-element specified in Table 1—the second EditText sub-element of Table 1—is shown in FIG. 3 as text entry (TE) region 330 to the right of text 328.

Table 1 continues with the Space sub-element which, as mentioned above will occupy rows 2, 3, and 4 of column 2 of the user-interface. As Table 1 numbers rows and columns starting with 0, the Space sub-element will occupy the third, fourth, and fifth rows of the third column in the corresponding user-interface. As shown in FIG. 3, space 332 (indicated using cross-hatching for clarity's sake) occupies the third, fourth, and fifth rows of the third column of user-interface 310. The fifth row of user-interface 310 is shown in the top portion of FIG. 3 as the extension of space 332 below text 328 and text entry region 330. In some embodiments, space components are not visible and thus do not have cross-hatching or any other visible indication of being part of a user-interface, such as user-interface 310.

Table 1 concludes with two Button sub-elements respectively corresponding to buttons 334 and 336. The Button sub-element corresponding to button 334 indicates that the button has text of "Manual setup" and is positioned to be in row 5, column 3 of the GridLayout; that is in the sixth row and fourth column of user-interface 310; just below and to the right of space 332. Finally, the Button sub-element corresponding to button 336 indicates that the button has text of "Next" and is positioned to be in GridLayout column 3 which is user-interface 310's fourth column. As button 334 is already occupying the fourth column in the sixth row of user-interface 310, FIG. 3 shows button 336 occupying the fourth column in the next or seventh row of user-interface 310.

The bottom portion of FIG. 3 shows columns and rows of user-interface 310 and corresponding grid lines (GLs). Grid lines are lines separating the rows and columns within a GridLayout element and in the corresponding user-interface. FIG. 3 shows user-interface 310 with seven rows 340-346 and four columns 350-353. Each row is defined by two grid lines: for example, FIG. 3 shows row 340 bounded above by grid line Y0 and bounded below by grid line Y1. Similarly, each column is defined by two grid lines: for example, FIG. 3 shows column 352 bounded to the left by grid line X2 and bounded to the right by grid line X3.

Figure 4:
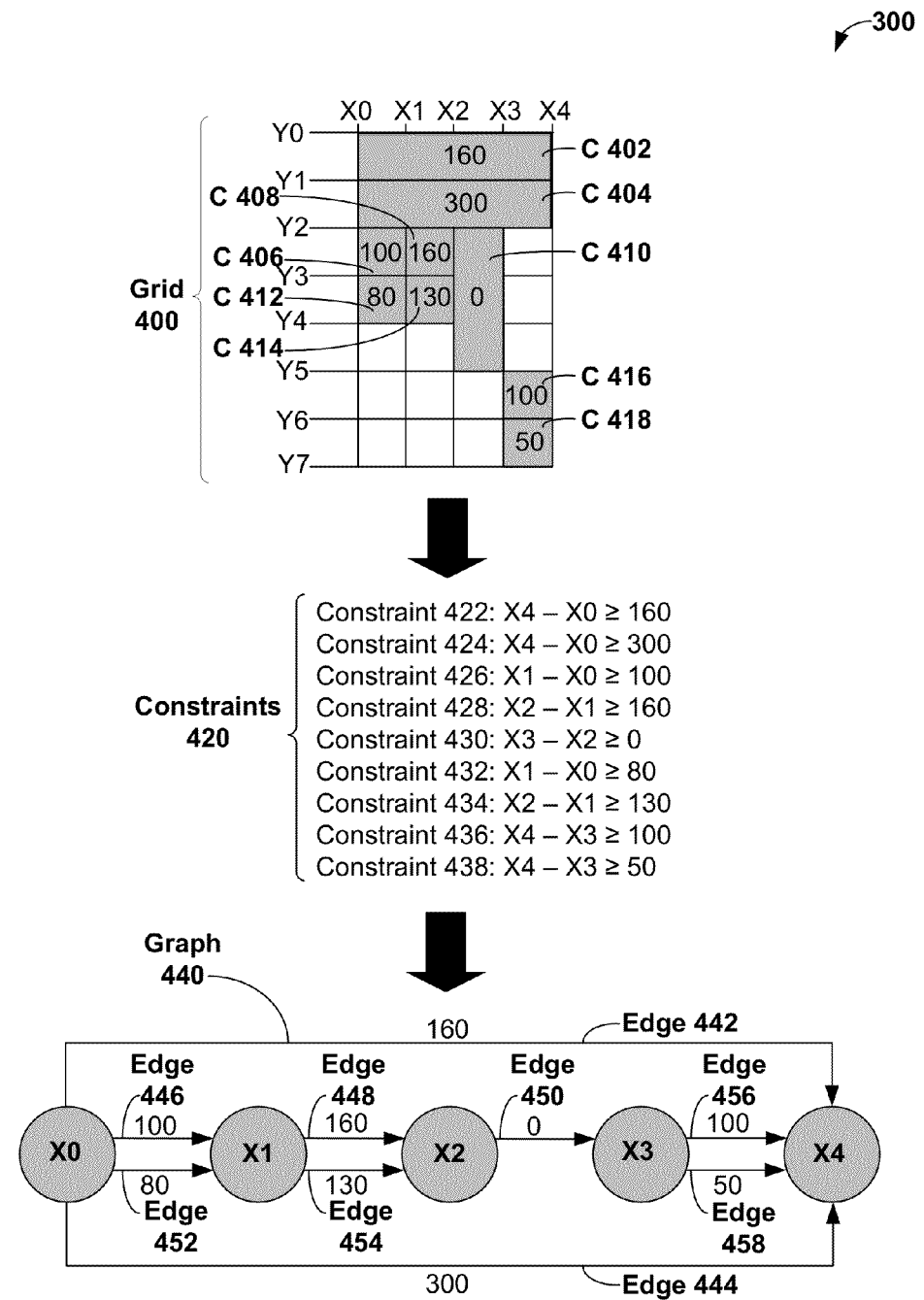
FIG. 4 shows an example grid, constraints, and graph corresponding to the example user-interface of FIG. 3, in accordance with an example embodiment.

FIG. 4 shows scenario 300 continuing with determination of constraints corresponding to the components within a layout, and determination of a graph corresponding to the constraints, in accordance with an embodiment.

The top portion of FIG. 4 depicts a grid 400 based on user-interface 310. FIG. 4 shows that grid 400 includes grid lines X0-X4 and Y0-Y7 as shown in FIG. 3 and, more particularly, based on the GridLayout element and sub-elements specified in Table 1 above. FIG. 4 also shows a set of components (C's) 402-418 depicted as grey rectangles that correspond to components 320-336 of user-interface 310. For example, component 402 of grid 400 corresponds to text 320 of user-interface 310, as both text 320 and component 402 are on the top row and both span all columns of either user-interface 310 (for text 320) or grid 400 (for component 402).

Table 2 shows the correspondence between user-interface components shown in FIG. 3 and grid components, constraints, and edges in graph 440 all shown in FIG. 4:

TABLE 2

| User-interface Component | Grid Component | Constraint | Edge in Graph 440 |
|---|---|---|---|
| Text 320 | Component 402 | Constraint 422 | Edge 442 |
| Text 322 | Component 404 | Constraint 424 | Edge 444 |
| Text 324 | Component 406 | Constraint 426 | Edge 446 |
| Text Entry Region 326 | Component 408 | Constraint 428 | Edge 448 |
| Text 328 | Component 412 | Constraint 432 | Edge 452 |
| Text Entry Region 330 | Component 414 | Constraint 434 | Edge 454 |
| Space 332 | Component 410 | Constraint 430 | Edge 450 |

TABLE 2-continued

| User-interface Component | Grid Component | Constraint | Edge in Graph 440 |
|---|---|---|---|
| Button 334 | Component 416 | Constraint 436 | Edge 456 |
| Button 336 | Component 418 | Constraint 438 | Edge 458 |

Each row and column of grid 400, like rows and columns of user-interface 310, are defined by two grid lines. For a row example, FIG. 4 shows the first row of grid 400 bounded above by grid line Y0 and bounded below by grid line Y1. As a column example, FIG. 4 shows the rightmost column of grid 400 bounded to the left by grid line X3 and bounded to the right by grid line X4.

Each component can determine numerical values for one or more sizes as it would be rendered on a display, and pass those numerical values on the layout manager. For the example of a text sub-element, a width and a height of the sub-element in pixels or other units can be determined. In some embodiments, the width and height values can be based on the text to be displayed, a font and font size used to display the text of the text sub-element, text features used (e.g. underlining, bold face, etc.) As one example, 72 points of text can be rendered within 1 inch of horizontal text, or on a display device displaying text at 96 pixels/inch, rendered within 96 horizontal pixels. In particular embodiments, the layout manager can add margins to the text which correspondingly increase the numerical height and/or width values of the text component.

In particular, the spacing requirements between the rectangles of user-interface 310 can be re-expressed, as needed, so that there is no excess space between components 402-418 of grid 400 of FIG. 4. However, as shown in FIG. 4, some or all of the components 402-418 of grid 400 can overlap either partially or completely.

FIG. 4 shows each component 402-418 of grid 400 with a corresponding width in pixels; for example, the text of user-interface component 320, and corresponding grid component 402, has been determined by the layout manager to fit within a component whose width is 160 pixels. In some scenarios not shown in FIG. 4, each component 402-418 can have a corresponding height in pixels as well. In some embodiments, component sizes, such as but not limited to, heights and/or widths, can be specified in units other than pixels. As shown in FIG. 4, grid 400 has a set of vertical grid lines {X0, X1 ... X4} and a set of horizontal grid lines {Y0, Y1 ... Y7}. In other scenarios, grid 400 can have only one set of grid lines (e.g., only vertical grid lines) or have more than two sets of grid lines (e.g., vertical, horizontal, and depth grid lines).

The horizontal and vertical aspects of the layout problem can be separated, permitting independent computation of the locations of grid lines for the rows and the locations of grid lines for the columns. As the horizontal and vertical aspects of the layout problem are independent, only computation of the locations of grid lines for the columns is described at this time to simplify scenario 300. See the discussion below regarding FIGS. 6C-6E and computation of locations for grid lines of rows.

As such, each component 402-418 of grid 400 has at least four properties:
1. A minimum width (may be zero).
2. A minimum height (may be zero).
3. Two grid lines from the set of grid lines {X0 ... X4} aligned with the component's left and right edges.
4. Two grid lines from the set of grid lines {Y0 ... Y7} are aligned with the component's top and bottom edges.

Once these properties have been determined for each component of user-interface 310 and corresponding grid 400, a set of numeric values corresponding to each grid line of the set of vertical grid lines {X0, X1, X2, ...} and horizontal grid lines {Y0, Y1, Y2, ...} are determined such that each child component has at least as much space as it requested.

As each component has a minimum width and is associated with two grid lines aligned with the component's left and right edges, a constraint can be determined that corresponds to these properties. For example, grid 400 shows the left edge of component 402 aligned with grid line X0, the right edge of component 402 aligned with grid line X4, and a pixel value (shown in the middle of component 402) of 160 pixels, indicating that component 402 is at least 160 pixels wide. As component 402 spans the width of grid 400, component 402 is aligned with grid line X0 on the left edge and grid line X4 on the right edge. These conditions correspond to constraint 422 of "X4−X0≥160" pixels.

As another example, grid 400 shows that the left edge of component 414 is aligned with grid line X1, the right edge of component 414 is aligned with grid line X2, and a pixel value (shown in the middle of component 414) of 130 pixels, indicating that component 414 is at least 160 pixels wide. These conditions for component 414 correspond to constraint 434 of "X2−X1≥130" pixels.

The middle portion of FIG. 4 shows a set of constraints 422-438. Each constraint of constraints 422-438 correspond to each component 402-418 of grid 400. As another example, constraint 430, which corresponds to component 410, indicates that a location of the right edge (X3) of component 410 has to be greater than or equal to a location of the left edge (X2) of component 410. In other scenarios, such as discussed below in the context of FIGS. 6C and 6D, similar constraints can be determined for the set of horizontal grid lines {Y0 ... Y7} of grid 400.

For each set of constraints, a graph can be determined with the nodes corresponding to the grid lines and the edges corresponding to the constraints on the grid lines. The bottom portion of FIG. 4 shows graph 440 with nodes shown as grey circles. Graph 440 has one node for each vertical grid line X0, X1, X2, X3, and X4. Graph 440 also has edges 442-458 corresponding to constraints 420. Each of edges 442-458 in graph 440 has a one-to-one correspondence with constraints 422-438. As stated above, each constraint 422-438 corresponds to a component 402-418 in grid 400. For example, as shown in Table 2 above, edge 444 corresponds to both component 404 and constraint 424.

As the location of X0 grid line can be pre-determined to be at the origin, e.g., X0=0, node X0 of graph 440 can be designated as a "source" node. Under the normal order condition, all vertical grid lines have locations to the right of X0, then the locations of all grid lines X0 ... X4 can be initially assumed to be non-negative. Further, as each location X0 ... X4 has to be determined to solve the layout problem. Thus, a value can be assigned to each node X0 ... X4 of graph 440 that corresponds to the maximum distance in pixels required to go from the source node X0 to that node.

A variant of the Bellman-Ford algorithm can operate on graph 440 to determine the maximum size in one dimension specified by each component in grid 400 and correspondingly, user-interface 310. The Bellman-Ford algorithm variant can be used to solve the single-source longest-path problem by assigning a value to each node beyond the source node, based on values of the edges of the corresponding graph, that represent a benefit from the source to each respective node. As the Bellman-Ford algorithm variant evaluates edges of the graph, the values of the nodes can be adjusted to either determine (a) the graph has a solution or (b) there are edges leading to a "positive cycle" on the graph. If the graph has a solution, the value at a given node corresponds to a benefit for a longest path between the source node and the given node.

In solving the single-source longest-path problem, the Bellman-Ford algorithm initially sets the value of the source node to 0 and sets the remaining node values to invalid values, such as +∞ or −∞. In some embodiments, the Bellman-Ford algorithm variant can initialize all of the node values to a common value, such as 0. In these embodiments, this is equivalent to connecting all nodes to a synthetic source node whose value is set to 0 and with the edge weights for the edges from the synthetic source node to all nodes all equal to the common value.

Figure 5:
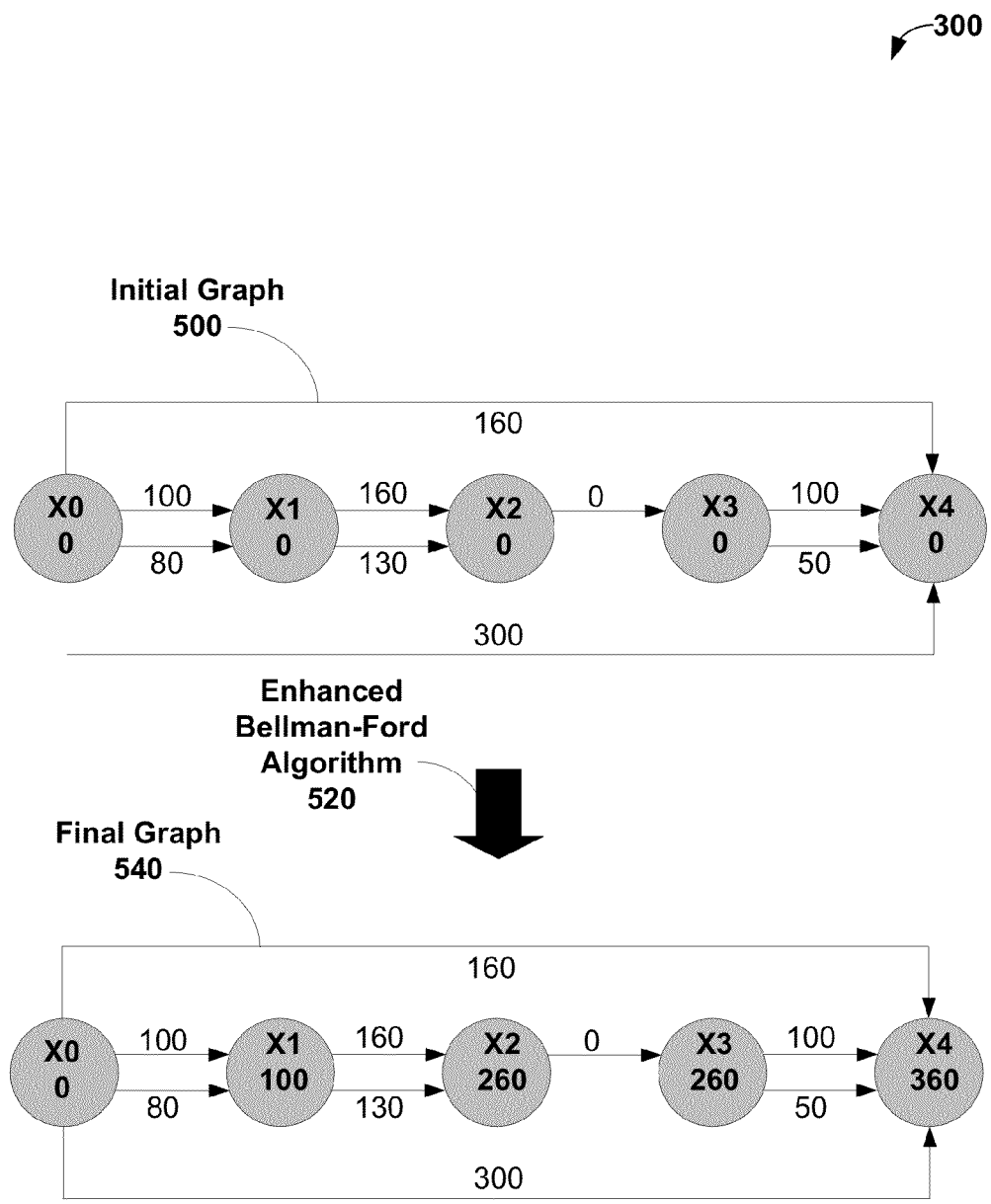
FIG. 5 shows initial and final graphs for the example graph shown in FIG. 4, in accordance with an example embodiment.

FIG. 5 shows initial graph 500 using a common value of 0 for all nodes X0 through X4. That is, initial graph 500 is initialized by the Bellman-Ford algorithm variant that initializes all node values to a common value of 0.

Pseudo-code of a variant of the Bellman-Ford algorithm that aborts when node values no longer change is presented in the Table 3 below. Table 3 shows a solve method that takes two parameters: a list of arcs (arcs), corresponding to the edges of the graph, and a list of locations (locations) corresponding to the nodes of the graph. The solve method in turn calls the relax function to determine if a node value should be updated or not.

TABLE 3

```
private boolean relax (int[ ] locations, Arc entry) {
    interval span = entry.span;
    int u = span.min;
    int v = span.max;
    int value = entry.value.value;
    int candidate = locations [u] + value;
    /* relax( ) solves single-source longest path problem
    * change ">" in next line to "<" to solve single-source
    * shortest-path problem
    */
    if (candidate > locations[v]) {
        locations[v] = candidate;
        return true;
    }
    return false;
}
private int[ ] solve (Arc [ ] arcs, int [ ] locations) {
    boolean changed = false;
    /* The Outer Loop */
    for (int i = 0; i < locations.length + 1;  i++) {
        changed = false;
        /* The Inner Loop*/
        for ( int j = 0, length = arcs.length; j < length;   j++) {
            changed = changed | relax(locations, arcs[j] );
        }
        /* End of the Inner Loop*/
        if (!changed) {
            break;
        }
    }
    /* End of the Outer Loop */
    if (changed) {
        exit_with_error ("Algorithm failed to terminate") ;
    }
    return locations;
}
```

In more detail, the solve method has an outer loop, indexed by i, that traverses the nodes (locations) of the graph. For each iteration of the outer loop, an inner loop is executed to traverse the edges (arcs) of the graph and tracks whether the taking the current edge (arcs [j]) would update the node values of the graph via a call to the relax method.

The relax method determines if a candidate value of the edge-source node's value (locations [u]) plus the current edge's weight (value) will increase the current edge-destination node's value (locations [v]). If the current edge-destination node's value will increase, the locations [v] value is set to the candidate value and a value of true (indicating the node values have been updated) is returned. If the current edge-destination node's value will not increase, the locations [v] value is unchanged and a value of false is returned, indicating the node values have not been updated.

In the solve method, the assignment "changed=changed|relax ( . . . );" indicates that the value of the changed Boolean value, which is initially set to be logical FALSE, is logically OR'd with the return value of the relax function. That is, as long as the relax function returns logical FALSE values, the changed value will remain logically FALSE. However, once the relax function returns a logical TRUE value, the changed value will be set to and remain as logical TRUE throughout the remaining iterations of the inner loop of the solve method.

The list of edges of the graph is then traversed, using the inner loop, a total of up to |V|−1 times, where |V| is the number of nodes (vertices) in the graph. The Bellman-Ford algorithm can either terminate with "valid" results if none of the node values are updated in an additional pass through the list of edges, or "invalid" if at least one node value is updated during the additional pass. The at least one node value is updated only when positive cycles are part of the graph. Thus, the Bellman-Ford algorithm takes O(|V|*|E|) instructions, where |E| is the number of edges.

The single-source longest path problem on a weighted digraph is equivalent to the much studied single-source shortest path problem on weighted digraph. The equivalence may be demonstrated as follows: given a weighted digraph G=(V, A) that includes of a set of directed arcs A, linking vertices, V; construct weighted graph, G'=(V, A') where, for all arcs a' in A' and a in A:

source($a'$)=source($a$), destination($a'$)=destination($a$), and weight($a'$)=−weight($a$).

A minimal path in G is a maximal path in G' and vice versa. Algorithms, such as Bellman-Ford, that solve the shortest paths problem for arcs with both positive and negative weights may be deployed to solve the longest path problem. Such use may be effected either by negating all of the weights in the graph or by changing the starting conditions and comparator used in the relax function shown in Table 3 below from "<" to ">". Where the algorithm is unmodified, its termination condition is unaffected. In the case where the algorithm is modified, the termination condition is correspondingly changed to reflect the properties of the negated graph on which it is operating. The Bellman-Ford algorithm variant modified to solve the single-source longest path problem terminates provided that its input contains no positive weight loops or "positive cycles."

A positive cycle involves a path from a first node, N1 through one or more other nodes, N2 . . . Nm, back to N1 with a sum of edge weights along the cycle being greater than 0; e.g., a positive weight path. Each traversal of the positive cycle can raise the benefit, or node value, of traveling from the source node to one or more nodes along the positive cycle. As each traversal of the positive cycle raises the value of at least some nodes, no maximum benefit for traveling from the source node to all other nodes can be determined, and thus the Bellman-Ford algorithm variant as shown in Table 3 above will not solve the single-source longest-path problem.

FIG. 5 shows an example final graph 540, such as can be determined by the solve method. FIG. 5 shows node X0 has a final value of 0, node X1 has a value of 100, X2 and X3 each have a value of 260, and X4 has a value of 360.

Figure 6A:
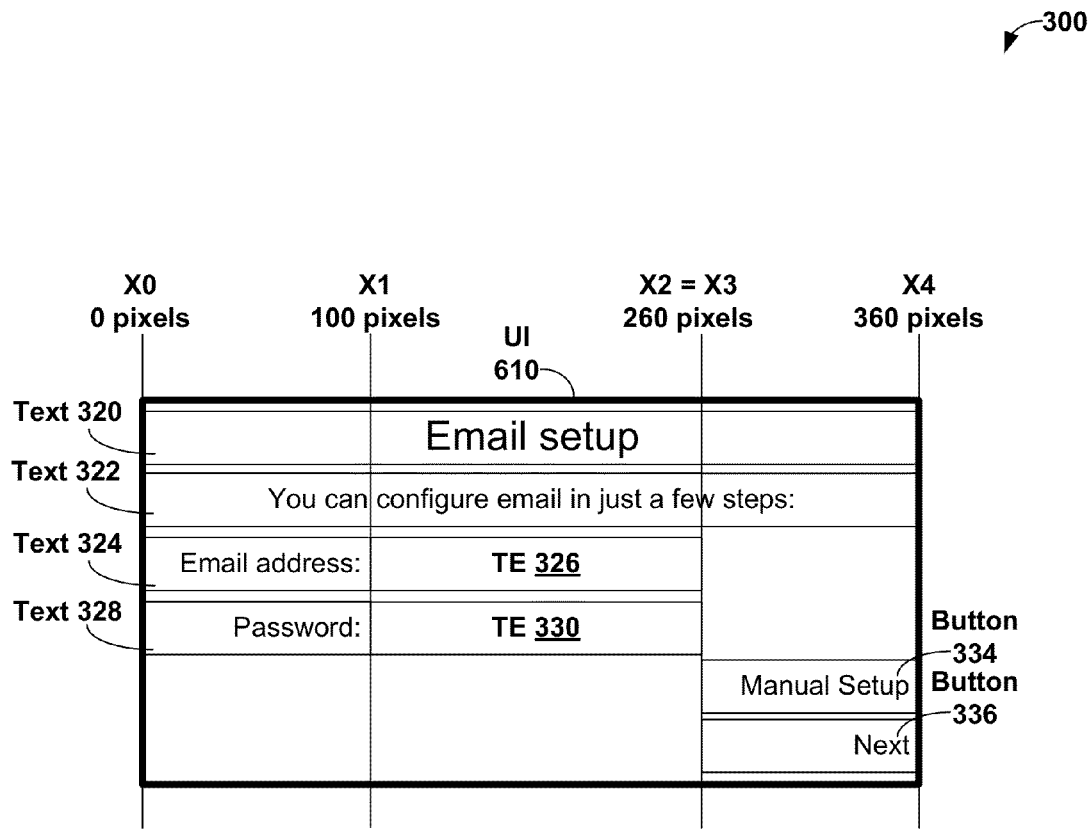
FIGS. 6A and 6B show example user-interfaces based on the values in the final graph of FIG. 5, in accordance with an example embodiment.

FIG. 6A shows scenario 300 continuing with a display of user-interface (UI) 610. User-interface 610 displays the components of user-interface 310 utilizing the node values determined for final graph 540. In particular, text components 320 and 322 are shown aligned between grid lines X0 at 0 pixels from the origin and X4 at 360 pixels from the origin, and text components 324 and 328 are shown aligned between grid lines X0 at 0 pixels and X1 at 100 pixels. Text entry regions 326 and 330 are shown aligned between grid lines X1 at 100 pixels from the origin and X2 at 260 pixels from the origin. Space component 332 is not shown in FIG. 6A as part of user-interface 610, as space component 332 is a non-visible component. Buttons 334 and 336 are shown aligned between grid lines X3 at 260 pixels from the origin and X4 at 360 pixels from the origin.

Scenario 300 continues with user-interface 610 being reduced in width by 50 pixels, for a total reduced width of 310 pixels. For example, a user of user-interface 610 can shrink a window containing user-interface 310 from at least 360 pixels wide down to 310 pixels wide. FIG. 6A shows that the width of user-interface 610 with all components, including space component 332, having non-negative widths is 360 pixels.

Figure 6B:
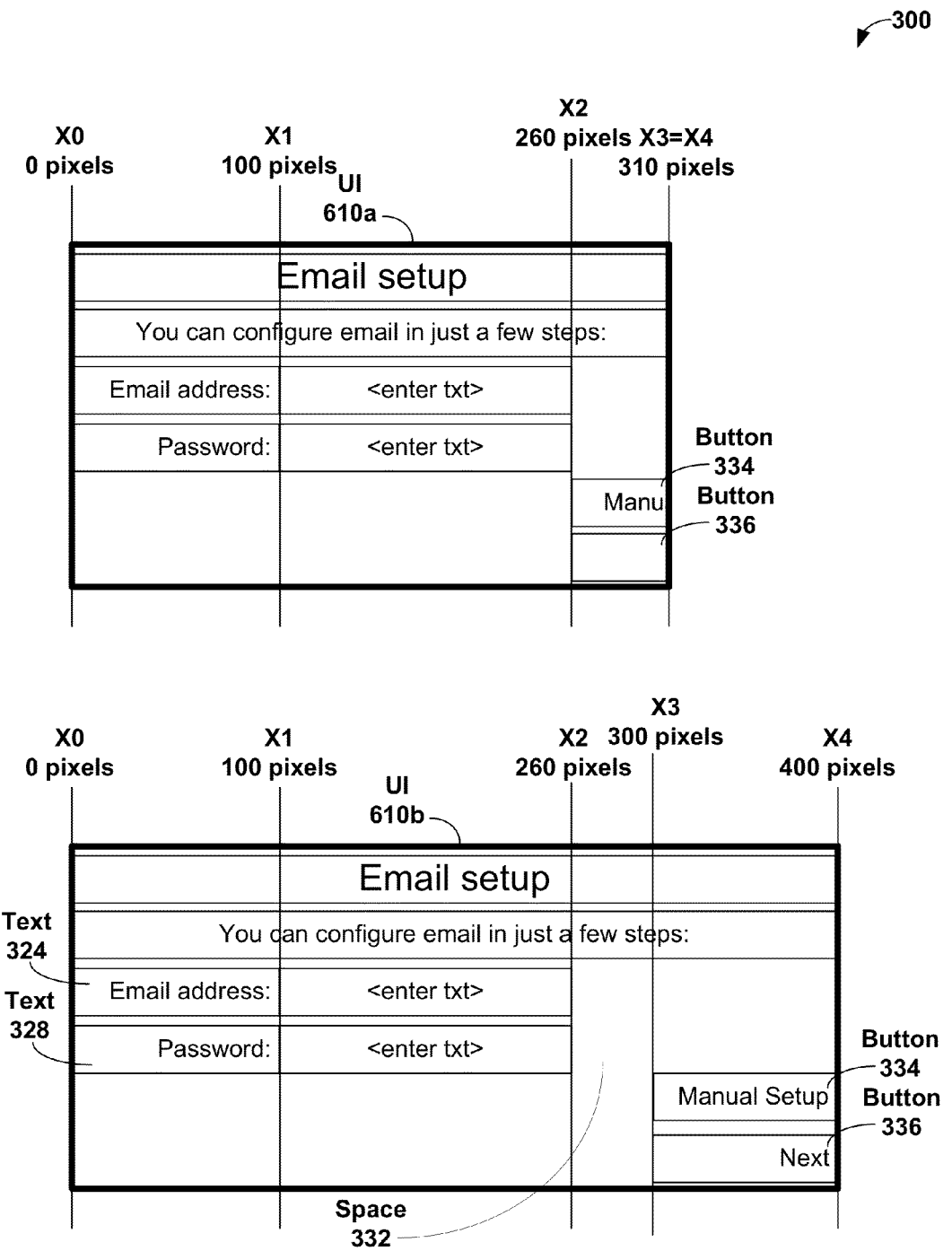

The top portion of FIG. 6B shows resized user-interface 610a with width 310 pixels and superimposed grid lines X0-X4. As can be seen at the top of FIG. 6B, grid line X3 is shown at the rightmost edge, along with grid line X4, at 310 pixels from grid line X0 in user-interface 610a. As such, FIG. 6B shows that buttons 334 and 336 have been truncated as the 310-pixel width of user-interface 610a is too small to show the entire widths of the column that includes buttons 334 and 336.

Buttons 334 and 336 were truncated because (1) the layout did not permit violation of the normal order for columns (e.g., Tables 1 and 1.1 do not have a parameter setting such as columnOrderPreserved="false") and (2) the fourth column of user-interface 610a, which contains buttons 334 and 336, has an inflexible component, therefore making the column non-flexible.

Table 1 shows that the portion of the layout corresponding to buttons 334 is as follows:
  <Button
  text="Manual setup"
  layout_row="5"
  layout_column="3"
  />

As mentioned above, in the case where "gravity" or horizontal/vertical alignment is not explicitly defined, such as shown above for button 334, the layout manager can infer that the component is non-flexible. Further, the layout manager infers that elements aligned in a column are flexible if all of the elements in the column are flexible. Since button 334 is an inflexible component, the layout manager infers that the fourth column of user-interface 610a is inflexible and therefore has a fixed width. Thus, the layout manager may partially or completely truncate display of buttons 334 and 336 when a width of user-interface 610a is too small to show the entire width of the fourth column of user-interface 610a.

Scenario 300 continues with user-interface 610a being increased in width by 90 pixels, for a total width of 400 pixels. For example, a user of user-interface 610a can expand a window containing user-interface 610a from 310 pixels wide to 400 pixels wide.

The bottom portion of FIG. 6B shows resized user-interface 610b with width 400 pixels and superimposed grid lines X0-X4. As can be seen at the bottom of FIG. 6B, grid line X3 is shown to the right of grid line X2 in user-interface 610b; that is, the grid lines of user-interface 610b are restored to the normal order.

As seen in FIG. 6B, for both user-interfaces 610a and 610b, text components 324 and 328 are "left-justified" or aligned with the left-most edge of respective user-interface 610a or 610b and buttons 334 and 336 are "right-justified" or aligned with the right-most edge of respective user-interface 610a or 610b. Both the left justification of components 324 and 328 and the right justification of components 334 and 336 is enabled by the adjustment of space 332 from a negative width of −50 pixels for user-interface 610a to a positive width of 40 pixels for user-interface 610b.

By permitting the space component to be flexible, solutions to the layout problem for the GridLayout element and sub-elements specified in Table 1 above can retain key features, such as left and right justification.

Figure 6C:
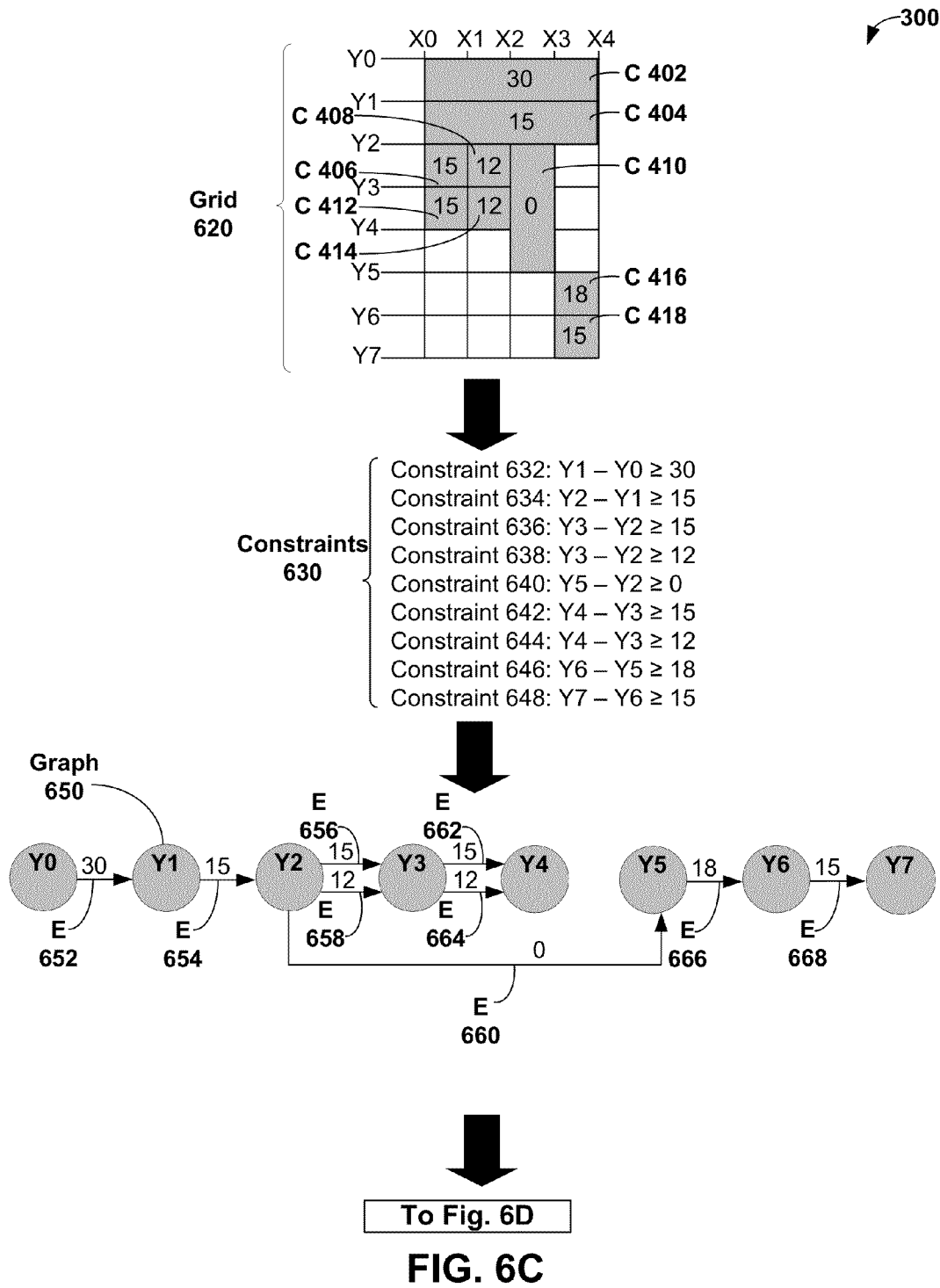
FIGS. 6C, 6D, and 6E show example user-interfaces based on height constraints on the example user-interface of FIG. 3, in accordance with an example embodiment.
Figure 6D:
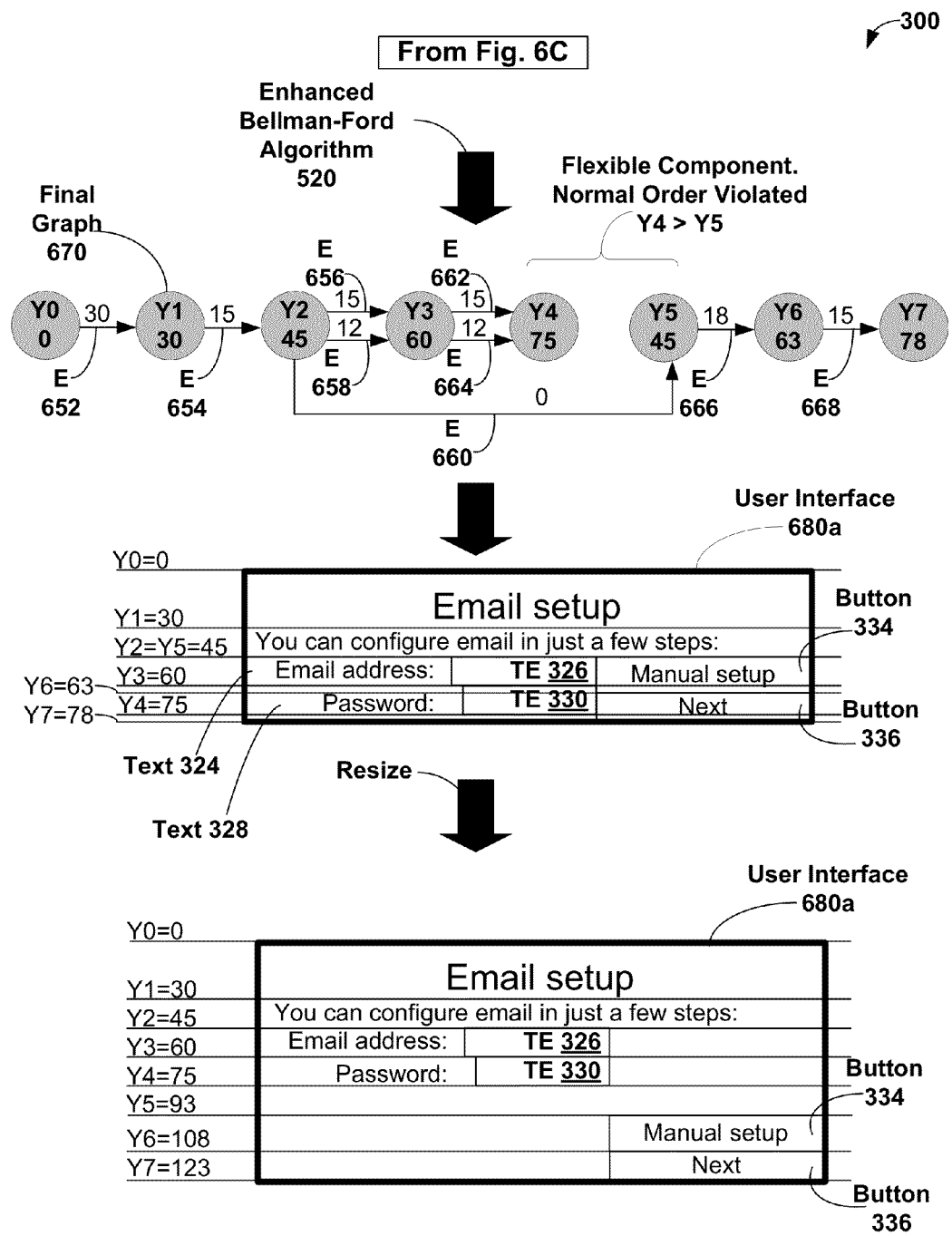
Figure 6E:
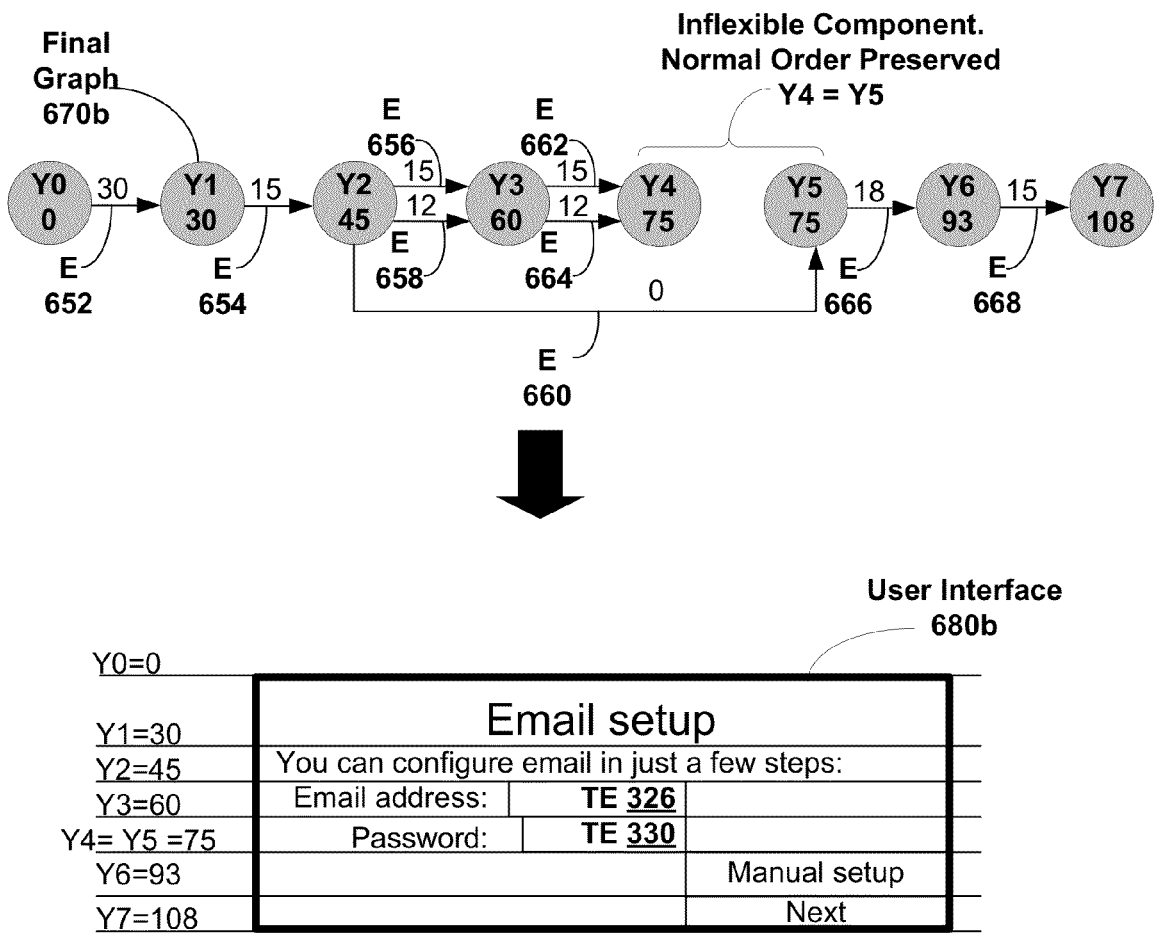

FIGS. 6C, 6D, and 6E show example user-interfaces based on height constraints on the example user-interface of FIG. 3, in accordance with an example embodiment.

The top portion of FIG. 6C depicts a grid 620 based on user-interface 310. FIG. 6C shows that grid 620 includes grid lines X0-X4 and Y0-Y7 as shown in FIG. 3 and, more particularly, based on the GridLayout element and sub-elements specified in Table 1 above. FIG. 6C also shows a set of components (C's) 402-418 depicted as grey rectangles that correspond to components 320-336 of user-interface 310.

Table 4 shows the correspondence between user-interface components shown in FIG. 3 and grid components, height constraints, and edges in graph 650 all shown in FIG. 6C.

TABLE 4

| User-interface Component | Grid Component | Height Constraint | Edge in Graph 650 |
|---|---|---|---|
| Text 320 | Component 402 | Constraint 632 | Edge 652 |
| Text 322 | Component 404 | Constraint 634 | Edge 654 |
| Text 324 | Component 406 | Constraint 636 | Edge 656 |
| Text Entry Region 326 | Component 408 | Constraint 638 | Edge 658 |
| Text 328 | Component 412 | Constraint 632 | Edge 662 |
| Text Entry Region 330 | Component 414 | Constraint 644 | Edge 664 |
| Space 332 | Component 410 | Constraint 640 | Edge 660 |
| Button 334 | Component 416 | Constraint 646 | Edge 666 |
| Button 336 | Component 418 | Constraint 648 | Edge 668 |

In particular, the spacing requirements between the rectangles of user-interface 310 can be re-expressed, as needed, so that there is no excess space between components 402-418 of grid 620 of FIG. 6C. However, as shown in FIG. 6C, some or all of the components 402-418 of grid 620 can overlap either partially or completely.

FIG. 6C shows each component 402-418 of grid 400 with a corresponding height in pixels; for example, the text of user-interface component 320, and corresponding grid component 402, has been determined by the layout manager to fit within a component whose height is 30 pixels. As shown in FIG. 6C, grid 620 has a set of vertical grid lines {X0, X1 . . . X4} and a set of horizontal grid lines {Y0, Y1 . . . Y7}. In other scenarios, grid 400 can have only one set of grid lines (e.g., only vertical grid lines) or have more than two sets of grid lines (e.g., vertical, horizontal, and depth grid lines).

As such, each component 402-418 of grid 400 has at least four properties:

1. A minimum width (may be zero).
2. A minimum height (may be zero).
3. Two grid lines from the set of grid lines {X0 . . . X4} aligned with the component's left and right edges.
4. Two grid lines from the set of grid lines {Y0 . . . Y7} are aligned with the component's top and bottom edges.

As each component has a minimum height and is associated with two grid lines aligned with the component's top and bottom edges, a constraint can be determined that corresponds to these properties. For example, grid 620 shows the top edge of component 402 aligned with grid line Y0, the bottom edge of component 402 aligned with grid line Y1, and a pixel value (shown in the middle of component 402) of 30 pixels, indicating that component 402 is at least 30 pixels high. These conditions correspond to constraint 632 of "Y1−Y0≥30" pixels.

As another example, grid 400 shows that the top edge of component 414 is aligned with grid line Y3, the bottom edge of component 414 is aligned with grid line Y2, and a pixel value (shown in the middle of component 414) of 12 pixels, indicating that component 414 is at least 12 pixels high. These conditions for component 414 correspond to constraint 644 of "Y4−Y3≥12" pixels.

The middle portion of FIG. 6C shows a set of constraints 632-648. Each one of constraints 632-648 corresponds to one of components 402-418 of grid 620. As another example, constraint 640, which corresponds to component 410, indicates that a location of the bottom edge (Y5) of component 410 has to be greater than or equal to a location of the top edge (Y2) of component 410. However, as component 410 is a flexible component, this constraint can permit relaxation of the normal ordering condition for intervening grid lines Y3 and Y4, such as discussed below in the context of FIG. 6D.

For each set of constraints, a graph can be determined with the nodes corresponding to the grid lines and the edges corresponding to the constraints on the grid lines. The bottom portion of FIG. 6C shows graph 650 with nodes shown as grey circles. Graph 650 has one node for each horizontal grid line Y0-Y7. Graph 650 also has edges (E) 652-668 corresponding to constraints 630. Each edge 652-668 of graph 650 corresponds to one of constraints 632-648, and as stated above, each constraint 632-648 corresponds to a component 402-418 of grid 620. For example, as shown in Table 4 above, edge 654 corresponds to both component 404 and constraint 634.

As the location of Y0 grid line can be pre-determined to be at the origin, e.g., Y0=0, node Y0 of graph 650 can be designated as a source node for the variant of the Bellman-Ford algorithm discussed above. The variant of the Bellman-Ford algorithm can operate on graph 650 to determine the maximum height specified by each component in grid 620 and correspondingly, user-interface 310.

FIG. 6D continues scenario 300 by applying the variant of the Bellman-Ford algorithm 520 for determining node values that solve the single-source longest path problem for graph 650. FIG. 6D shows final graph 670 with node values of: 0 for Y0, 30 for Y1, 45 for Y2, 60 for Y3, 75 for Y4, 45 for Y5, 63 for Y6, and 78 for Y7. These node values can be considered as pixel values for grid lines Y0 through Y7 in laying out user-interface 680*a*.

Recall from Tables 1 and 1.1 above, that the row order preservation parameter for the GridLayout element was set equal to "false" to indicate that the layout manager is permitted to relax the normal order constraint for the rows of the layout. Thus, as both (a) the corresponding component and column are flexible and (b) the layout permits violation of the normal order condition for row ordering, the layout manager can permit violation of the normal order condition for rows.

Additionally, recall that component 410 is a flexible component. Because the layout manager is permitted to relax the normal order condition for rows, the layout manager is permitted to interchange rows as long as the constraint associated with component 410 is satisfied. Constraint 640, associated with component 410, indicates that Y5−Y2 must be greater than or equal to zero. Thus, as shown in final graph 650, the node values of nodes Y2 and Y5 are equal and set to 45 pixels. However, the node values of nodes Y3 and Y4, respectively 60 and 75 pixels, are greater than the node value of node Y5, thus violating the normal order condition. However, as Y3 and Y4 are intervening grid lines for component 410—that is, grid lines to that do not appear in a constraint related to component 410, the normal order condition can be violated for the intervening grid lines, if (a) the corresponding component and column (for heights) or row (for widths) are flexible and (b) the layout permits violation of the normal order condition in the desired direction.

Also, recall from Tables 1 and 1.4 above, that the layout_gravity for space component 410 is specified to be "fill"; thus, a gravity in the vertical direction has been specified. Since gravity has been specified for component 410, then the layout manager can infer component 410 is flexible. Since component 410 is flexible and the only component in the third column of user-interface 300, the third column is a flexible column.

FIG. 6D shows a corresponding user-interface 680*a* corresponding to final graph 670 with the normal order condition violated. That is, FIG. 6D shows the row for button 334 overlapping with the row for text 324 and text entry region 326 and shows the row for button 336 overlapping with the row for text 328 and text entry region 330. Also, the row height between grid line Y4 (at 75 pixels) and Y5 (at 45 pixels) is negative—this row height is −30 pixels, indicating the normal order condition was violated for the row between Y4 and Y5.

Scenario 300 continues with a resize operation that stretches the height of user-interface 680*a* to be 123 pixels tall. As such, FIG. 6D shows each of the four rows respectively displaying (i) text 324 and text entry region 326, (ii) text 328 and text entry region 330, (iii) button 334, and (iv) button 336 without overlapping. Upon resizing, user-interface 680*a* has a space of 18 pixels between grid line Y4, corresponding to the bottom of the row for text 328/text entry region 330, and grid line Y5, corresponding to top of the row for button 334.

In a scenario not shown in the Figures, a resize operation that shrinks the height of user-interface 680*a* to be 78 pixels tall would lead to user-interface 680*a* with the rows for buttons 334 and 336 overlapping the respective rows for text 324 and text entry 326 and text 328 and text entry 330. Thus, removing the normal order constraint permits negative spacing between some grid lines and permits solutions to the layout problem with overlapping rows, columns, etc.

While the example shown in FIGS. 6C and 6D involves rows, in scenarios not shown in the Figures, the normal order constraint can be relaxed in other dimensions to permit overlapping and negative width columns, to permit negative widths and overlapping slices along a Z or depth axis, and relaxed for other dimensions as well.

FIG. 6E shows graph 670b, which is a variation of graph 670 where the normal order condition for rows is preserved (i.e., not violated). One technique to enforce the normal order is to add and enforce |V| normal-order constraints to the system of constraints. The |V| normal-order constraints can be of the form: $Y_1-Y_0 \geq 0$, $Y_2-Y_1 \geq 0$, ... $Y_{i+1}-Y_i \geq 0$, ... $Y_{|V|}-Y_{|V|-1} \geq 0$, with $|V|-1>i>1$ (for rows), or $X_1-X_0 \geq 0$, $X_2-X_1 \geq 0$, ... $X_{i+1} \geq 0$, ... $X_{|V|}-X_{|V|-1} \geq 0$, with $|V|-1>i>1$ (for columns). Then, to relax the normal order for a subset of contiguous grid lines associated with rows, e.g., $Y_{r1}$ ... $Y_{r2}$, where r1=the first relaxed grid line, and r2 is the last relaxed grid line, the corresponding normal-order constraints $Y_{r1+1}-Y_{r1} \geq 0$, ... $Y_{r2}-Y_{r2-1} \geq 0$ can be removed from the system of constraints. Similarly, to relax the normal order for a subset of contiguous grid lines associated with columns, e.g., $X_{r1}$ ... $X_{r2}$, where r1=the first relaxed grid line, and r2 is the last relaxed grid line, the corresponding normal-order constraints $X_{r1+1}-X_{r1} \geq 0$, ... $X_{r2}-X_{r2-1} \geq 0$ can be removed from the system of constraints.

FIG. 6E shows final graph 670b, which is graph 670 of FIG. 6D with the normal order preserved by setting node values for Y4 and Y5 equal to 75. Also, node values Y6 and Y7 are updated from those of graph 670 by adding the previous difference of 30 between node values for Y4 and Y5, to the respective node values of Y6 and Y7. User-interface 680b of FIG. 6E uses the node values from final graph 670b, preserving the normal order and is shown toward the bottom of FIG. 6E.

Figure 7A:
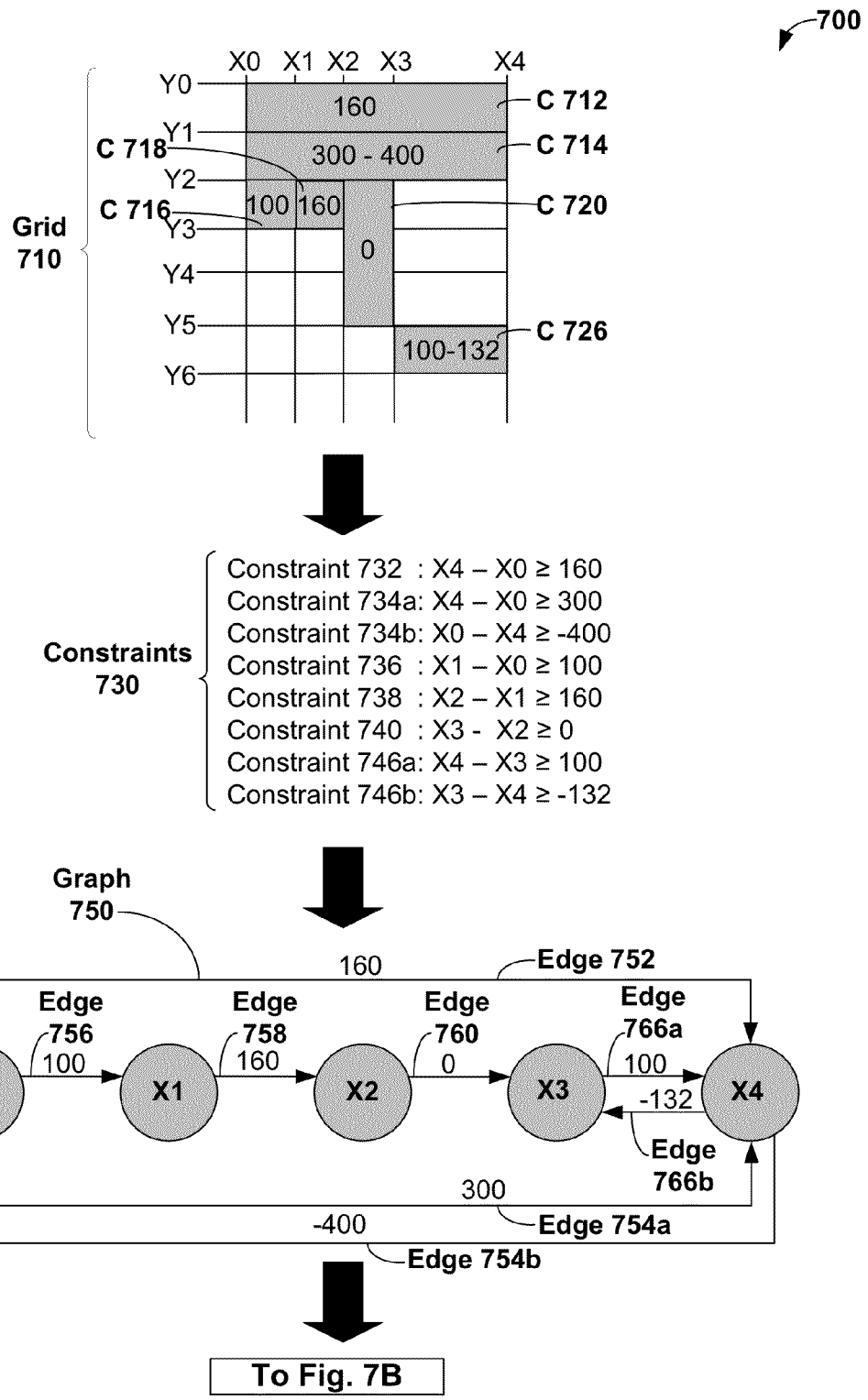
FIGS. 7A and 7B show another scenario including specification of ranges of values in an example grid, and corresponding constraints, final graph, and user-interface, in accordance with an example embodiment.
Figure 7B:
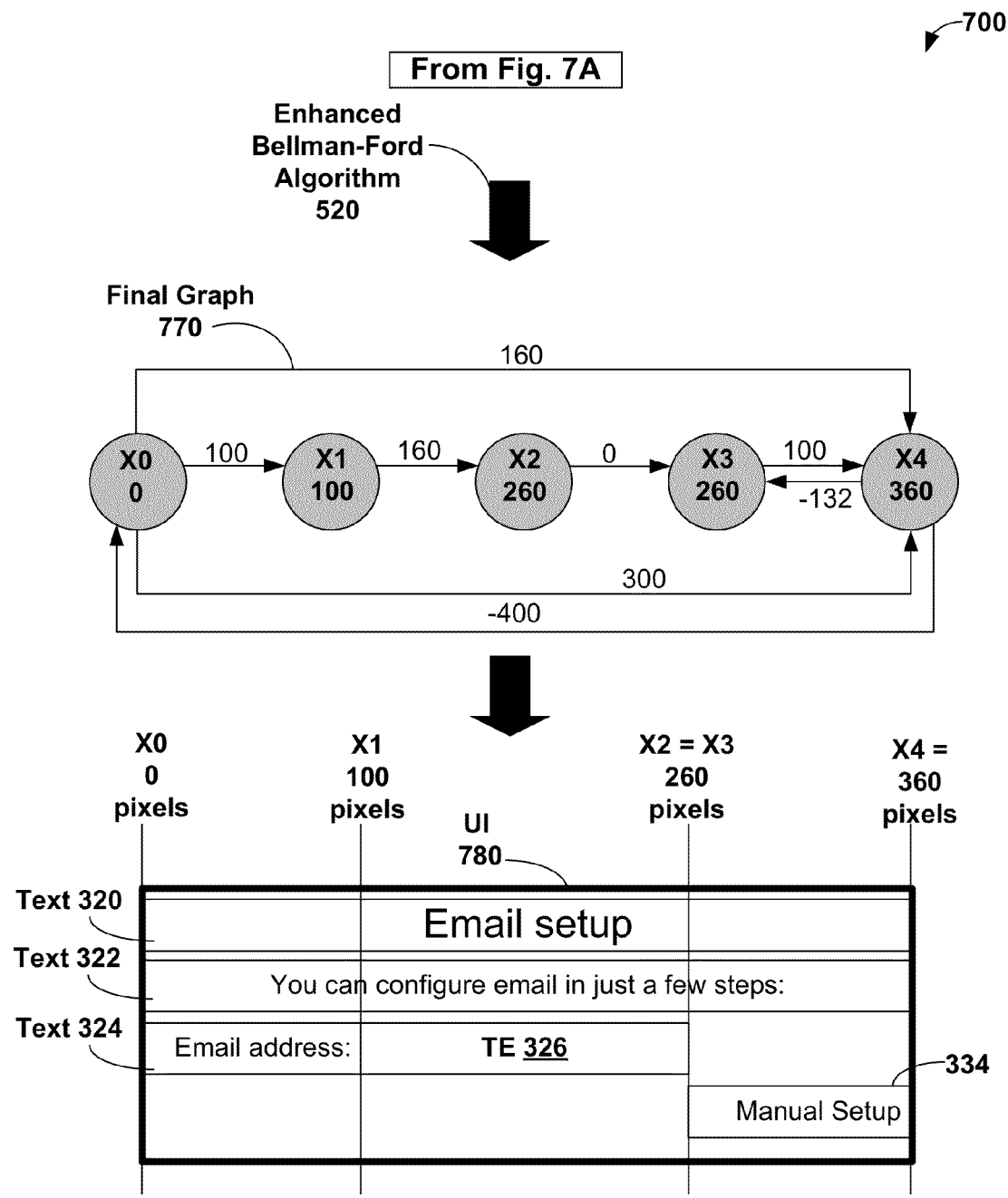

FIGS. 7A and 7B show an example scenario 700 with an example grid 710 with some components whose sizes are specified using ranges, and corresponding constraints 730, graph 750, final graph 770, and user-interface (UI) 770. FIG. 7A shows grid 710 with a set of components (C's) 712, 714, 716, 718, 720, 720, each depicted as a grey rectangle.

In scenario 700, user-interface 310 has been modified to remove text component 328, text entry region 330 and button 336. Also for scenario 700, the specifications of text component 322 and button 334 have been modified to specify widths in terms of ranges of pixels rather than using fixed pixel amounts. As such, the top of FIG. 7A shows grid 710 indicating (a) the width of text component 322 is specified as a range of pixel values 300-400, (b) no entries in grid 710 for text component 328, text entry region 330 and button 336, (c) and the width of button 334 is specified as a range of pixel values 100-132.

The middle portion of FIG. 7A shows constraints 732, 734a, 734b, 736, 738, 740, 746a, and 746b. As mentioned above, the width of text component 322 is specified as a range of pixel values from a minimum of 300 pixels to a maximum of 400 pixels. Text component spans from grid line X0 on the left to grid line X4 on the right. Thus, the minimal and maximal constraints corresponding to this range of widths for text component 322 are:

$$X4-X0 \geq 300$$

$$X4-X0 \leq 400$$

To properly use both of these constraints on the same graph, both constraints should be the same kind of inequality; i.e., to use a single-source longest-path algorithm, both constraints must be written in terms of greater than ">" or greater-than-or-equal "≥" signs, or to use a single-source shortest-path algorithm, both constraints must be written in terms of less than "<" or less-than-or-equal "≤" signs.

To use a single-source longest-path algorithm, the "X4−X0<400" inequality can be rewritten as using a greater-than-or-equal sign by taking the negative values of both sides of the inequality: "X0−X4≥−400." Continuing with scenario 700, the middle of FIG. 7A shows constraints 730 corresponding to grid 710. In particular, component 714 of grid 710 has been translated into two constraints: constraint 734a with X4−X0≥300, and constraint 734b with X0−X4≥−400. Also, component 726 has been translated into two constraints: constraint 746a with X4−X3≥100 and constraint 746b with X3−X4≥−132.

A directed-graph (or "digraph") can be used in place of an undirected graph to accommodate two or more numbers (or weights), rather than one, in the characterization of the edge costs for edges between two vertices A and B. The digraph allows graphs in which the cost or benefit of traveling from A to B may be different from the cost or benefit of traveling from B to A, such as when a component, such as component 714 or component 726, has a size that lies between a minimum and maximum value.

The bottom portion of FIG. 7A includes graph 750 corresponding to constraints 730. Graph 750 includes edges 752, 754a, 754b, 756, 758, 760, 766a, and 766b. In particular, edges 754a and 754b correspond to respective constraints 734a and 734b and edges 766a and 766b correspond to respective constraints 746a and 746b. Both edges 754b and 766b can be classified as "backwards edges" as the destination node of each of these edges is associated with a smaller label than the source node of each edge. For example, edge 754b has a destination node with a label of X0 which is smaller than the label of the source node, which is X4. Also, both edges 754b and 766b have negative edge weights; for edge 754b, the edge weight is −400 and for edge 766b, the edge weight is −132. In contrast, the remaining edges can be classified as "forward edges" as the destination node of each of these edges is associated with a larger label than the source node of each edge.

FIG. 7B continues scenario 700 by applying the variant of the Bellman-Ford algorithm for determining node values that solve the single-source longest-path problem for graph 750. FIG. 7B shows graph 770 with node values of: 0 for X0, 100 for X1, 260 for X2 and X3, and 360 for X4. These node values can be considered as pixel values for grid lines X0 through X4 in laying out user-interface 780.

FIG. 7B shows, at the bottom, scenario 700 continuing with a display of user-interface (UI) 780. User-interface 780 displays the components of user-interface 310 that were selected for inclusion in, and invoking the constraints of grid 710, as well as utilizing the node values determined for final graph 770. In particular, text components 320 and 322 are shown aligned between grid lines X0 at 0 pixels from the origin and X4 at 360 pixels from the origin, and text component 324 is shown aligned between grid lines X0 at 0 pixels and X1 at 100 pixels. Text entry region 326 is shown aligned between grid lines X1 at 100 pixels from the origin and X2 at 260 pixels from the origin. Space component 332 is not shown in FIG. 7B as part of user-interface 770, as space component 332 is a non-visible component. Button 334 is shown aligned between grid lines X3 at 260 pixels from the origin and X4 at 360 pixels.

Reliable Bellman-Ford Variants

Some layouts lead to sets of constraints that are mutually inconsistent. An example on a desktop system might be the shrinking of a window to a size smaller than is necessary to display all of the contained components at their minimum size. The standard Bellman-Ford algorithm can detect this condition but reports failure in this case without returning a usable solution.

The contract for a constraint solver can be modified to specify the intended behavior in the case of inconsistencies, such as inconsistent constraints, by modifying the graph to remove edges, and therefore constraints, that may lead to the inconsistencies. The following pseudo-code for a modified Bellman-Ford algorithm can operate with inconsistent constraints:

0. Place the edges of the graph provided to the modified Bellman-Ford algorithm into an ordered list. The order of edges within the ordered list can indicate priority associated constraints, where higher-priority edges precede lower-priority edges in the list. Also, associate a Boolean culprit value $C_i$ with each edge of the graph $E_i$ that indicates whether or not the relax function of the Bellman-Ford algorithm of Table 3 above, operating on edge $E_i$, returned a logical TRUE value at any point during the execution of the Bellman-Ford algorithm. The $C_i$ values can be initialized to logical FALSE. The use of the term "list" does not imply a particular data structure; rather, any data structure configurable to perform the actions described herein for the ordered list can be used as a data structure for the ordered list.

For example, consider graph 440 of FIG. 4. Graph 440 has 9 edges with each edge 442-458 associated with a respective constraint 422-438. Then, place the edges 442-458 into the ordered list, where the first edge in the ordered list is the highest priority edge of graph 440, the second edge in the ordered list is the second-highest priority edge of graph 440, and so on down to the ninth edge in the ordered list being the lowest priority edge of graph 440. Each of the nine edges can be associated with a culprit value $C_i$ initially set to FALSE, with i ranging from 1 to 9.

1. Initialize each node value in the graph provided to the modified Bellman-Ford, using a common value of 0 for all nodes.
2. Run the Bellman-Ford algorithm.
3. If the Bellman-Ford algorithm reports success, exit.
4. Set each culprit value $C_i$ to FALSE.
5. Run the Bellman-Ford algorithm again without reinitializing node values, and permanently setting a culprit value $C_i$ to TRUE when the relax function of the Bellman-Ford algorithm of Table 3 above, operating on edge $E_i$, returns a logical TRUE value, indicating that edge $E_i$ was used to update a node value.
6. Find the largest value LV for which the corresponding culprit value $C_{LV}$ is set to TRUE. Then, for the largest value LV found, remove edge $E_{LV}$ from the graph as a culprit edge. In some embodiments, a signal can be provided to software and/or hardware components that a user-interface constraint, corresponding to culprit edge $E_{LV}$ was removed. In some scenarios, the removed user-interface constraint can be related to a size of a window displaying the user-interface. For example, the removed user-interface constraint may indicate the displaying window is too small to show the entire user-interface, perhaps triggering a change in window size, addition of scroll bars, or some other action. Other signals and/or actions are possible as well.

7. Repeat from Step 1.
8. End.

Faster Bellman-Ford Variants

To increase performance of the variant of the Bellman-Ford algorithm shown in Table 3 above, the list of edges (arcs) can be topologically sorted prior to calling the solve method. A topological sort of a list of edges E is an ordering of a list of nodes N of a graph G such that if an edge E(u, v) is an edge from node u to node v, with u, v in N, u comes before v in the ordering of the list of nodes N.

For example, one list of vertices for either initial graph 500 or final graph 540 of FIG. 5 is {X0, X1, X2, X3, X4}. Thus, an example topologically sorted list of edges of either graph 500 or 540, can be {E(X0, X1, 100), E(X0, X1, 80), E(X1, X2, 160), E(X1, X2, 130), E(X2, X3, 0), E(X0, X4, 160), E(X0, X4, 300), E(X3, X4, 100), E(X3, X4, 50)}, where E(u, v, v') is the edge of graph 500 or 540 from node u to node v with value v'. Other topologically sorted lists of edges are possible as well.

The list of edges can be split into two portions: a forward-edge portion including all and only forward edges and a backward-edge portion including all and only backward edges. When topologically sorting the list of edges, each portion can be separately topologically sorted. That is, the forward edges of the forward-edge portion can be topologically sorted separately from the backwards edges of the backward-edge portion. Then, after the separate topological sorts, the two portions can be rejoined into the list of edges. The rejoined list of edges can be ordered so that each edge in the forward-edge portion precedes all edges of the backward-edge portion. Thus, the backward edges have higher indices in the list of edges.

Then, by processing topologically sorted lists of edges, the solve method typically determines node values for all nodes in the graph using two iterations of the outer loop: one iteration to have the inner loop determine the node values based on the topologically sorted list of edges, and a second iteration to have the inner loop determine that the node values did not change. When the node values do not change during an iteration of the inner loop, the changed variable of the solve method will be logically FALSE, and thus the outer loop will be terminated using the break statement.

Typically, when the solve method shown in Table 3 is executed using separated forward and backward-edge portions, and with each portion being separately topologically sorted, the solve method will take a constant number of outer loop iterations. As discussed above, each outer loop iteration requires O(|E|) iterations of the inner loop. As each inner loop involves O(1) instructions, the O(|E|) iterations of the inner loop take O(|E|) instructions. Thus, the solve method shown in Table 3 using separated forward and backward-edge portions, each portion being separately topologically sorted, will typically require O(|E|) instructions.

Example Operations

FIGS. 8-15 are flow charts that illustrate various example embodiments. These embodiments may involve and/or be performed by a computing device, such as a programmable device or server device shown in FIG. 1, a computing device shown in FIG. 2A, and/or a computing cluster shown in FIG. 2B. Descriptions of these embodiments may be read in context of the discussion of FIGS. 3-7B, above.

Figure 8:
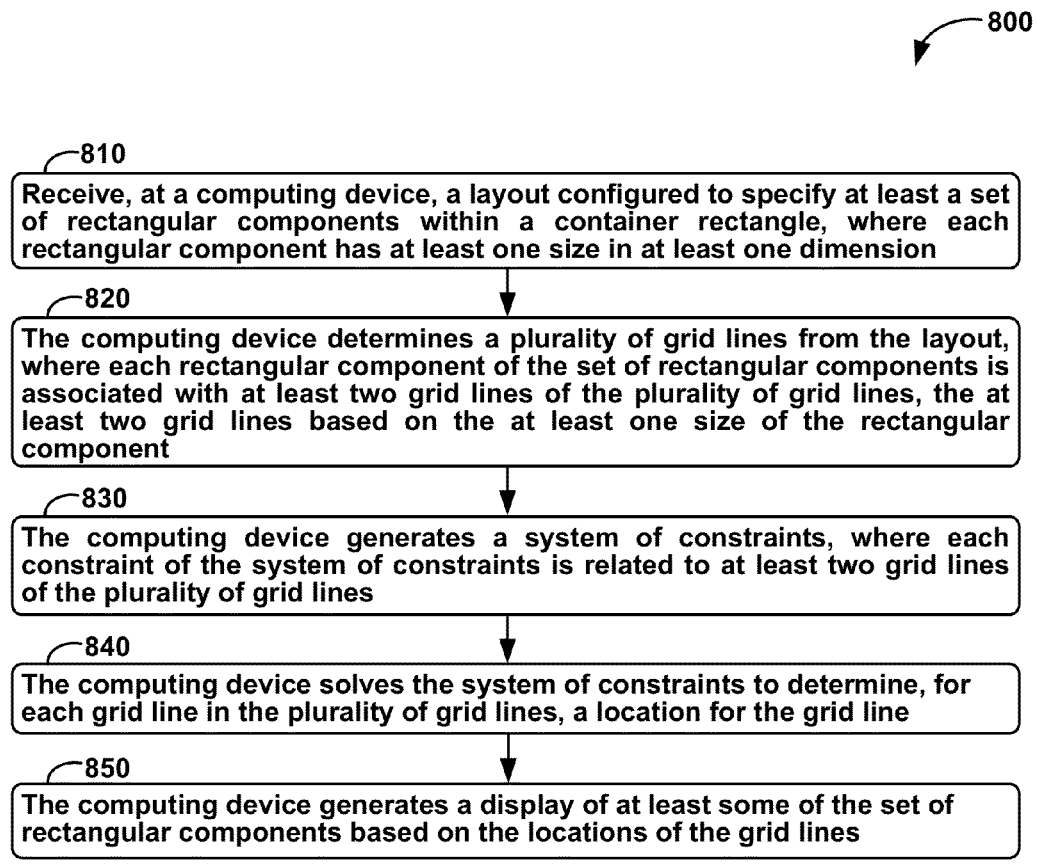
FIG. 8 is a flow chart of a method, in accordance with an example embodiment.

FIG. 8 is a flow chart of method 800, in accordance with an example embodiment. Method 800 begins at block 810, where a computing device can receive a layout. The layout can be configured to specify at least a set of rectangular components within a container rectangle. Each rectangular component can have at least one size in at least one dimension.

At block 820, the computing device can determine a plurality of grid lines from the layout. Each rectangular component of the set of rectangular components can be associated with at least two grid lines of the plurality of grid lines. The at least two grid lines can be based on the at least one size of the rectangular component.

In some embodiments, the layout can be configured to specify at least a space component as a component in the set of rectangular components. In other embodiments, the layout is configured to specify a flexibility of at least one rectangular component in the set of rectangular components. In even other embodiments, the layout can be configured to specify at least a GridLayout element.

At block 830, the computing device can generate a system of constraints. Each constraint of the system of constraints can be related to at least two grid lines of the plurality of grid lines.

At block 840, the computing device can solve the system of constraints. The computing device can determine, for each grid line in the plurality of grid lines, a location for the grid line.

In some embodiments, solving the system of constraints to determine, for each grid line in the plurality of grid lines, the location for the grid line includes: (a) labeling each grid line in the plurality of grid lines with a label, (b) ordering the plurality of grid lines based on the label; and (c) utilizing a normal ordering of the grid lines based on the ordering of the plurality of grid lines, such as discussed above in the context of at least FIGS. 6A and 6B.

In other embodiments, the set of components includes a non-visible component. In these other embodiments, solving the system of constraints to determine, for each grid line in the plurality of grid lines, the location for the grid line includes: (a) determining two or more grid lines associated with the non-visible component, and (b) relaxing the normal ordering of the grid lines for at least the two or more grid lines associated with the non-visible component such as discussed above in the context of at least FIGS. 6A and 6B.

In some embodiments, solving the system of constraints to determine, for each grid line in the plurality of grid lines, a location for the grid line includes: (a) generating a graph including a plurality of nodes and a plurality of edges, where the plurality of nodes correspond to the plurality of grid lines, and where the plurality of edges correspond to the system of constraints, and (b) solving a single-source path-length problem for the graph to determine the locations for the grid lines.

In some embodiments, solving the single-source path-length problem for the graph to determine the locations for the grid lines can include solving the single-source path-length problem using a variant of the Bellman-Ford algorithm.

In some embodiments: (a) the graph can be a directed graph, (b) at least a first and a second edge of the plurality of edges can be respectively associated with a first constraint and a second constraint of the system of constraints, (c) both the first and second constraints can be associated with a single rectangular component of the set of rectangular components, (d) the first constraint can include a constraint on a minimum value for the single rectangular component, (e) the second constraint can include a constraint on a maximum value for the single rectangular component, and (f) a direction of the first edge can differ from a direction of the second edge, such as discussed above in the context of at least FIGS. 7A and 7B.

In particular embodiments, method 800 can include: (g) separating the plurality of edges into at least a first portion of edges and a second portion of edges, where the first edge is in the first portion, where the second edge is in the second portion, where a direction of each edge in the first portion is the direction of the first edge, and where a direction of each edge in the second portion is the direction of the second edge, (h) topologically sorting the first portion of edges, (i) topologically sorting the second portion of the plurality of edges separately from the first portion of edges, and (j) solving the single-source path-length problem using a variant of the Bellman-Ford algorithm operating upon the topologically-sorted first portion of edges and the topologically-sorted second portion of edges, such as discussed above.

In more particular embodiments, solving the single-source path-length problem using the variant of the Bellman-Ford algorithm operating upon the topologically-sorted first portion of edges and the topologically-sorted second portion of edges includes: (k) generating an ordering of the plurality of edges, where each edge in the topologically-sorted first portion of edges precedes each edge in the topologically-sorted second portion of edges; (l) generating a ordered plurality of edges, including at least the topologically-sorted first portion of edges and the topologically-sorted second portion of edges, based on the ordering of the plurality of edges; and (m) solving the single-source path-length problem using a variant of the Bellman-Ford algorithm operating upon the ordered plurality of edges.

In still more particular embodiments, solving the single-source path-length problem using a variant of the Bellman-Ford algorithm operating upon the ordered plurality of edges includes: (n) after using the variant of the Bellman-Ford algorithm, determining that there are one or more inconsistent constraints in the system of constraints, (o) identifying one or more culprit edges in the ordered plurality of edges corresponding to the one or more inconsistent constraints; and (p) removing a highest-ordered culprit edge of the one or more culprit edges from the ordered plurality of edges.

In other embodiments, solving the single-source path-length problem for the graph to determine the locations for the grid lines includes solving the single-source path-length problem using a variant of the Bellman-Ford algorithm. Solving the single-source path-length problem using a variant of the Bellman-Ford algorithm can include topologically sorting at least a portion of the plurality of edges prior to invoking the variant of the Bellman-Ford algorithm.

At block 850, the computing device can generate a display of at least some of the set of rectangular components based on the locations of the grid lines.

In some embodiments, the computing device can display the display of the least some of the set of rectangular components. In some embodiments, a computing device that generated the display of the at least some of the set of rectangular components can display the at least some of the set of rectangular components on a display associated with the computing device. In other embodiments, the computing device that generated the display of the at least some of the set of rectangular components can transmit the display to another computing device for the another computing device to display on a display associated with the another computing device.

Figure 9:
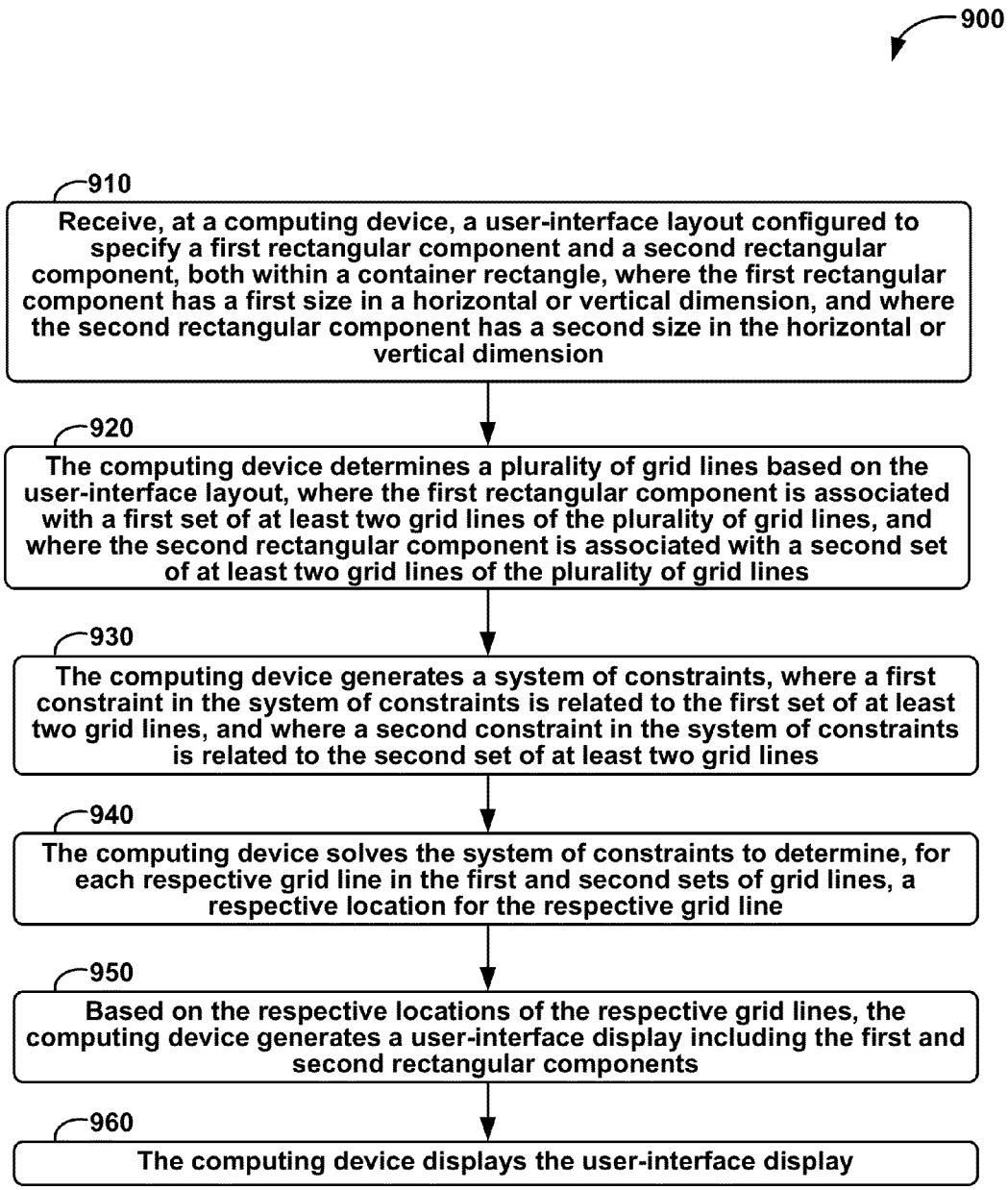
FIG. 9 is a flow chart of a method, in accordance with an example embodiment.

FIG. 9 is a flow chart of a method 900, in accordance with an example embodiment. Method 900 begins at block 910, where a computing device can receive a user-interface layout. The user-interface layout can be configured to specify at least first rectangular component and a second rectangular component, both within a container rectangle. The first rectangular component can have a first size in a horizontal or vertical dimension, and the second rectangular component can have a second size in the horizontal or vertical dimension.

In some embodiments, the first rectangular component can have the first size and a third size, where the first size is in the horizontal dimension, and where the third size is in the vertical dimension.

At block 920, the computing device can determine a plurality of grid lines based on the user-interface layout. The first rectangular component can be associated with a first set of at least two grid lines of the plurality of grid lines, and the second rectangular component can be associated with a second set of at least two grid lines of the plurality of grid lines.

In some embodiments, determining the plurality of grid lines based on the user-interface layout can include determining the first set of at least two grid lines of the plurality of grid lines based on the first size and determining a third set of at least two grid lines of the plurality of grid lines based on the third size.

At block 930, the computing device can generate a system of constraints. A first constraint in the system of constraints can be related to the first set of at least two grid lines, and a second constraint in the system of constraints can be related to the second set of at least two grid lines.

In some embodiments, the system of constraints can include a horizontal system of constraints and a vertical system of constraints. In particular embodiments, the horizontal system of constraints can include at least one constraint based on the first set of at least two grid lines, and the vertical system of constraints can include at least one constraint based on the third set of at least two grid lines.

At block 940, the computing device can solve the system of constraints to determine, for each respective grid line in the first and second sets of grid lines, a respective location for the respective grid line.

In some embodiments, solving the system of constraints includes: (a) generating a graph including a plurality of nodes and a plurality of edges, where the plurality of nodes correspond to the plurality of grid lines, and where the plurality of edges correspond to the system of constraints, and (b) using a variant of a Bellman-Ford algorithm to solve a single-source path-length problem for the graph to determine the locations for the grid lines.

In other embodiments, solving the system of constraints includes: (c) solving the horizontal system of constraints to determine a plurality of horizontal locations and (d) solving the vertical system of constraints to determine a plurality of vertical locations. In particular embodiments, solving the horizontal system of constraints includes solving the horizontal system of constraints independently from solving the vertical system of constraints. In other particular embodiments, the plurality of horizontal locations includes a location for each respective grid line in the first set of at least two grid lines, and the plurality of vertical locations includes a location for each respective grid line in the third set of at least two grid lines.

At block 950, the computing device, based on the respective locations of the respective grid lines, can generate a user-interface display to include the first and second rectangular components.

In some embodiments, generating the user-interface display including the first and second rectangular components includes generating the user-interface display with the first component horizontally located based on the locations of the grid lines in the first set of at least two grid lines and vertically located based on the locations of the grid lines in the third set of at least two grid lines.

At block 960, a computing device can display the user-interface display.

Figure 10:
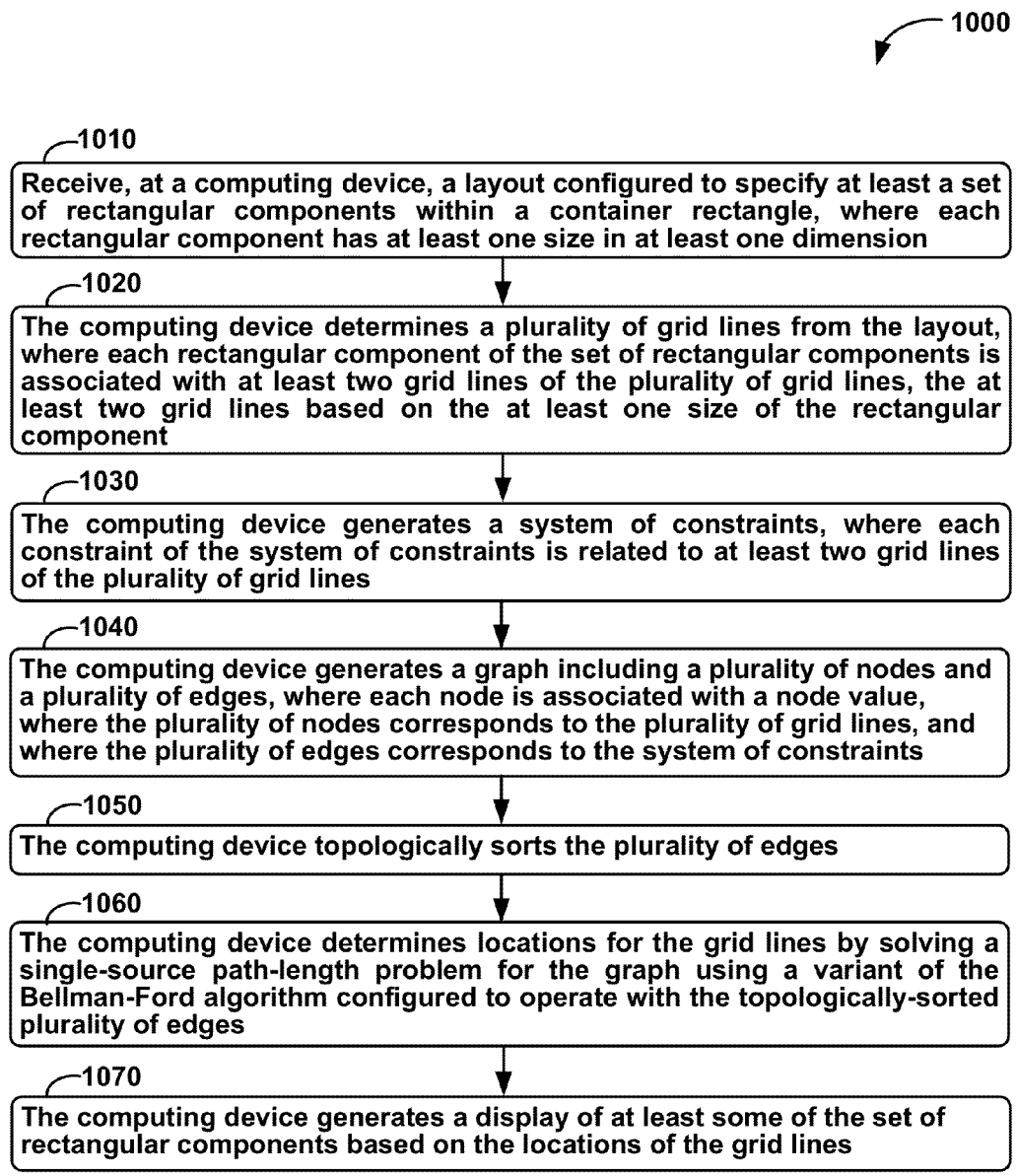
FIG. 10 is a flow chart of a method, in accordance with an example embodiment.

FIG. 10 is a flow chart of a method 1000, in accordance with an example embodiment. Method 1000 begins at block 1010, where a computing device can receive a layout. The layout can be configured to specify at least a set of rectangular components within a container rectangle. Each rectangular component can have at least one size in at least one dimension.

In some embodiments, a particular rectangular component of the set of rectangular components can have at least a particular-component height and a particular-component width. In particular embodiments, the particular rectangular component additionally has at least a particular-component depth.

In other particular embodiments, the plurality of grid lines can include a plurality of horizontal grid lines and a plurality of vertical grid lines. The particular rectangular component can be associated with at least two horizontal grid lines of the plurality of horizontal grid lines that are related to the particular-component height. The particular rectangular component can be associated with at least two vertical grid lines of the plurality of vertical grid lines that are related to the particular-component width. The system of constraints can include a system of horizontal constraints corresponding to the plurality of horizontal grid lines and a system of vertical constraints corresponding to the plurality of vertical grid lines.

In more particular embodiments, generating the graph can include: (a) generating a first graph associated with the plurality of horizontal grid lines and the system of horizontal constraints and (b) generating a second graph associated with the plurality of vertical grid lines and the system of vertical constraints. Then, solving the single-source path-length problem for the graph can include: (c) solving a first single-source path-length problem for the first graph to determine locations for the plurality of horizontal grid lines and (d) solving a second single-source path-length problem for the second graph to determine locations for the plurality of vertical grid lines. Also, generating the display can include generating a display of at least some of the set of rectangular components based on the locations for the plurality of horizontal grid lines and the locations for the plurality of vertical grid lines.

At block 1020, the computing device can determine a plurality of grid lines from the layout. Each rectangular component of the set of rectangular components can be associated with at least two grid lines of the plurality of grid lines. The at least two grid lines can be based on the at least one size of the rectangular component.

At block 1030, the computing device can generate a system of constraints. Each constraint of the system of constraints can be related to at least two grid lines of the plurality of grid lines.

At block 1040, the computing device can generate a graph including a plurality of nodes and a plurality of edges. Each node can be associated with a node value. The plurality of nodes can correspond to the plurality of grid lines. The plurality of edges can correspond to the system of constraints.

In some embodiments: (a) the graph can be a directed graph, (b) at least a first and a second edge of the plurality of edges can be respectively associated with a first constraint and a second constraint of the system of constraints, (c) both the first and second constraints can be associated with a single rectangular component of the set of rectangular components, (d) the first constraint can include a constraint on a minimum value for the single rectangular component, (e) the second constraint can include a constraint on a maximum value for the single rectangular component, and (f) a direction of the first edge can differ from a direction of the second edge.

At block 1050, the computing device can topologically sort the plurality of edges.

In particular embodiments, topologically sorting the plurality of edges can include: (a) separating the plurality of edges into at least a first portion of edges and a second portion of edges, where the first edge is in the first portion, where the second edge is in the second portion, where a direction of each edge in the first portion is the direction of the first edge, and where a direction of each edge in the second portion is the direction of the second edge, (b) topologically sorting the first portion of edges.

At block 1060, the computing device can determine locations for the grid lines by solving a single-source path-length problem for the graph. The single-source path-length problem can be solved using a variant of the Bellman-Ford algorithm that is configured to operate with the topologically-sorted plurality of edges.

In some embodiments, solving the single-source path-length problem for the graph using the variant of the Bellman-Ford algorithm configured to operate with the topologically-sorted plurality of edges can include solving the single-source path-length problem using a variant of the Bellman-Ford algorithm operating upon the topologically-sorted first portion of edges and the topologically-sorted second portion of edges.

In particular embodiments, solving the single-source path-length problem using the variant of the Bellman-Ford algorithm operating upon the topologically-sorted first portion of edges and the topologically-sorted second portion of edges can include: (a) generating an ordering of the plurality of edges, where each edge in the topologically-sorted first portion of edges precedes each edge in the topologically-sorted second portion of edges, (b) generating an ordered plurality of edges, including at least the topologically-sorted first portion of edges and the topologically-sorted second portion of edges, based on the ordering of the plurality of edges, and (c) solving the single-source path-length problem using a variant of the Bellman-Ford algorithm operating upon the ordered plurality of edges.

In yet other embodiments, the variant of the Bellman-Ford algorithm configured to operate with the topologically-sorted plurality of edges can include an inner loop and an outer loop. The outer loop can be configured to traverse the plurality of nodes. The inner loop can be configured to traverse a plurality of edges associated with a node of the plurality of nodes and determine whether at least one node weight has changed during traversal of the plurality of edges associated with the node. In particular embodiments, the outer loop can be configured to terminate upon determining that at least one node weight has not changed during traversal of the plurality of edges associated with the node.

At block 1070, the computing device can generate a display of at least some of the set of rectangular components based on the locations of the grid lines.

In some embodiments, the computing device can display the display of the least some of the set of rectangular components.

Figure 11:
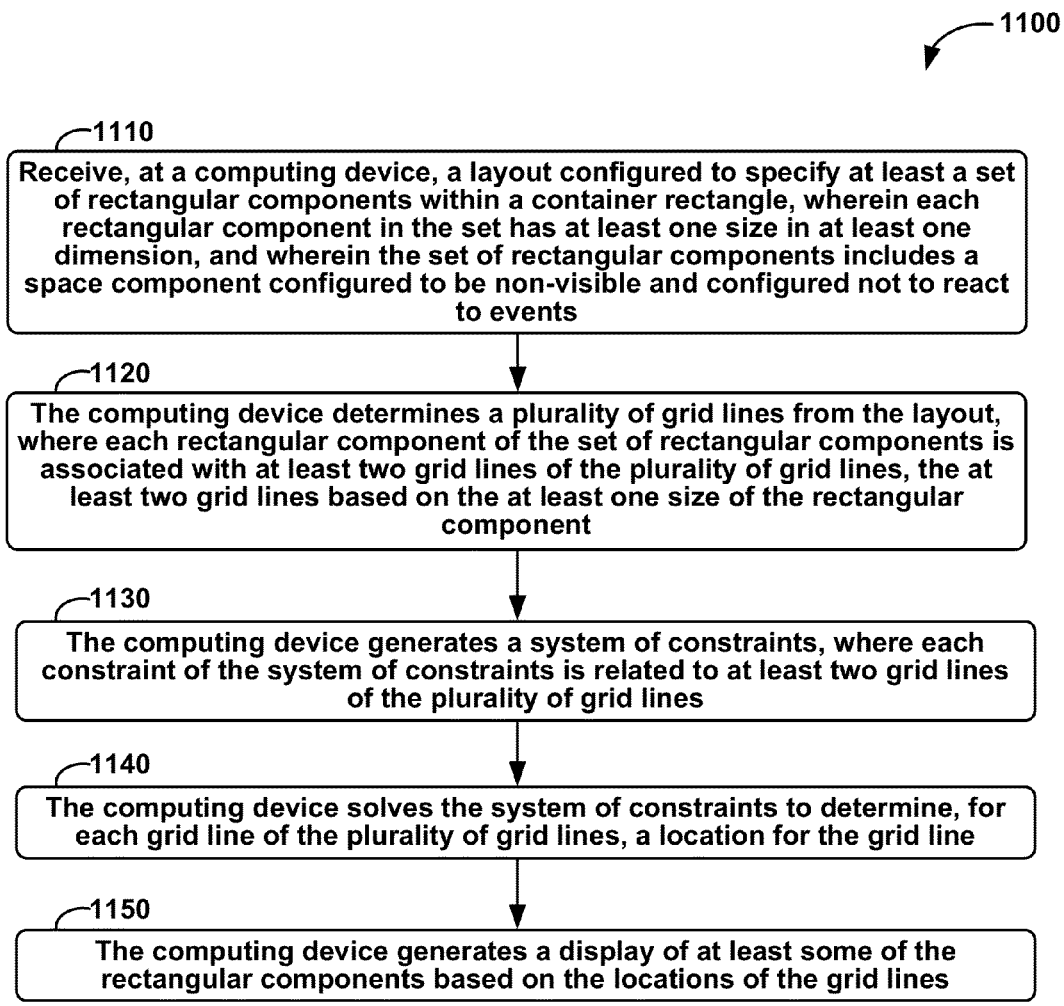
FIG. 11 is a flow chart of a method, in accordance with an example embodiment.

FIG. 11 is a flow chart illustrating method 1100, in accordance with an example embodiment. Method 1100 begins at block 1110, where a computing device can receive a layout. The layout can be configured to specify at least a set of rectangular components within a container rectangle. Each rectangular component of the set of rectangular components can have at least one size in at least one dimension. The set of rectangular components can include a space component configured to be non-visible and configured not to react to user-interface events.

At block 1120, the computing device can determine a plurality of grid lines from the layout. Each rectangular component of the set of rectangular components can be associated with at least two respective grid lines of the plurality of grid lines. The at least two respective grid lines can be based on the at least one size of the rectangular component.

At block 1130, the computing device can generate a system of constraints. Each respective constraint of the system of constraints can be related to at least two respective grid lines of the plurality of grid lines.

At block 1140, the computing device can solve the system of constraints to determine, for each grid line of the plurality of grid lines, a location for the grid line.

In some embodiments, solving the system of constraints can include solving the system of constraints using a variant of the Bellman-Ford algorithm.

At block 1150, the computing device can generate a display of at least some of the set of rectangular components based on the locations of the grid lines.

In some embodiments, the computing device can display the at least some of the respective rectangular components, where the space component can be displayed transparently.

In other embodiments, the user-interface events can include clicks, taps, mouse-overs, and pinch-gestures.

In still other embodiments, the space component is configured using one or more parameters. In particular embodiments, the one or more parameters include a row parameter, a column parameter, a gravity parameter, and combinations thereof.

In yet other embodiments, each component in the set of rectangular components can be associated with a widget. In particular embodiments, each widget associated with a component in the set of rectangular components can inherit from a common super-class. In more particular embodiments, the widget associated with the space component can have a class that is a sub-class of the common super-class.

In some embodiments, the space component is configured to be a flexible component. In particular embodiments, a request to resize the display of at least some of the set of rectangular components can be received; and in response to the request to resize the display, the flexible space component can be resized. In more particular embodiments, resizing the flexible space component includes relaxing a normal order condition for the flexible space component. In still more particular embodiments, the display can be resized, where at least one pair of rows or columns of the display overlap based on the flexible space component.

Figure 12:
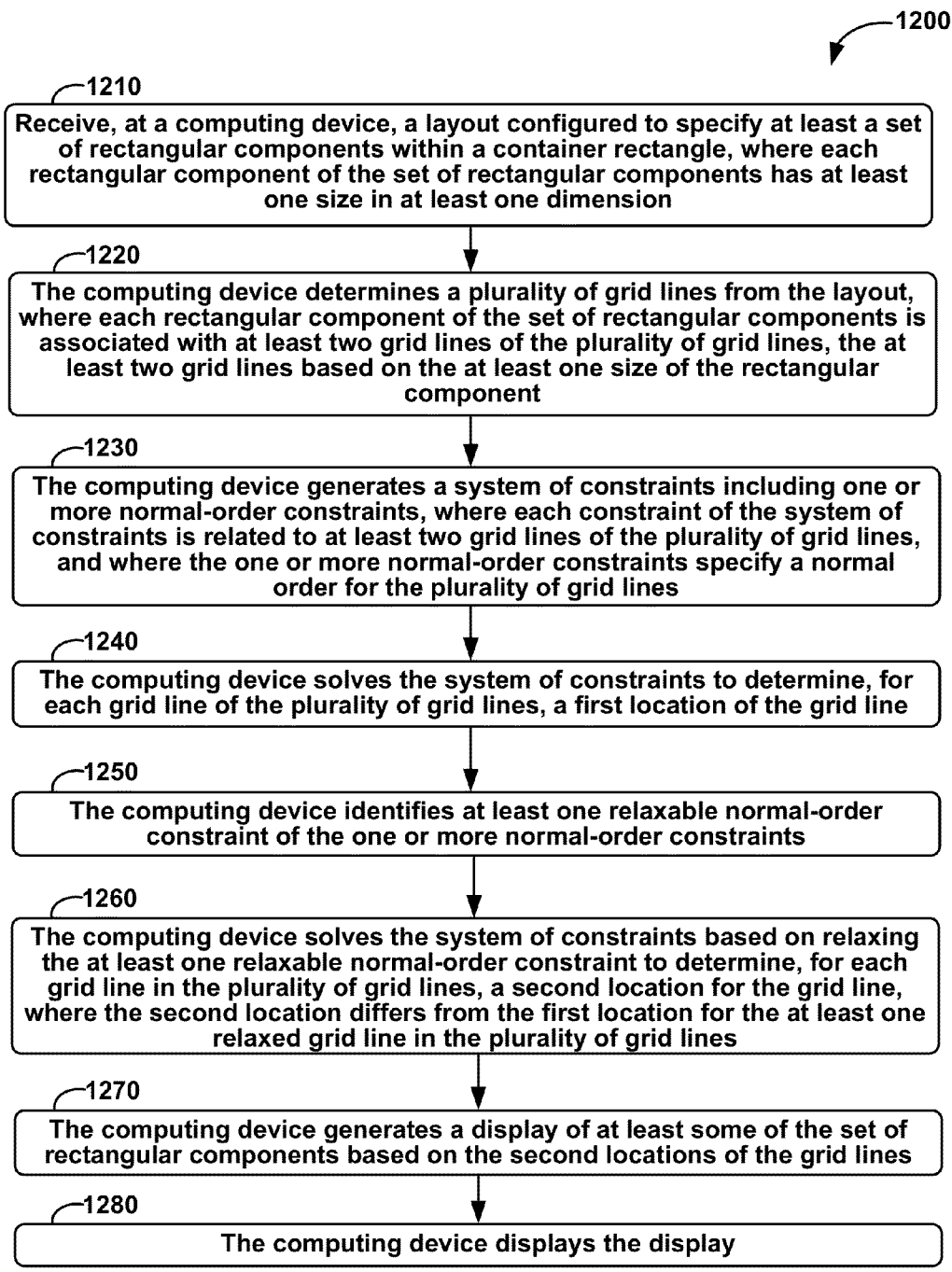
FIG. 12 is a flow chart of a method, in accordance with an example embodiment.

FIG. 12 is a flow chart of method 1200, in accordance with an example embodiment. Method 1200 begins at block 1210, where a layout can be received at a computing device. The layout can be configured to specify at least a set of rectangular components within a container rectangle. Each rectangular component can have at least one size in at least one dimension.

At block 1220, the computing device can determine a plurality of grid lines from the layout. Each rectangular component of the set of rectangular components can be associated with at least two grid lines of the plurality of grid lines. The at least two grid lines can be based on the at least one size of the rectangular component.

In some embodiments, the plurality of grid lines can include n+1 grid lines Y0, Y1, ..., Yn with n>0. Each of the n+1 grid lines can correspond to constraints on rows in the display. In particular embodiments, the one or more normal-order constraints can include n+1 constraints of the form $Y_{i+1} - Y_i \geq 0$, where i is an integer between 0 and n−1, inclusive.

In other embodiments, the plurality of grid lines can include m+1 grid lines $X0, X1, \ldots, Xm$ with $m>0$. Each of the m+1 grid lines can correspond to constraints on columns in the display. In particular embodiments, the one or more normal-order constraints can include m+1 constraints of the form $X_{i+1} - X_i \geq 0$, where i is an integer between 0 and m−1, inclusive.

At block 1230, the computing device can generate a system of constraints. The system of constraints can include one or more normal-order constraints. Each constraint of the system of constraints can be related to at least two grid lines of the plurality of grid lines. The one or more normal-order constraints can specify a normal order for the plurality of grid lines.

At block 1240, the computing device can solve the system of constraints to determine, for each grid line of the plurality of grid lines, a first location for the respective grid line.

In some embodiments, solving the system of constraints can include solving the system of constraints using a variant of the Bellman-Ford algorithm.

At block 1250, the computing device can identify at least one relaxable normal-order constraint of the one or more normal-order constraints.

At block 1260, the computing device can solve the system of constraints based on relaxing the at least one relaxable normal-order constraint to determine, for each grid line in the plurality of grid lines, a second location for the grid line. The second location can differ from the first location for at least one relaxed grid line in the plurality of grid lines.

In some embodiments, the second location for the at least one relaxed grid line can be less than the first location for the at least one relaxed grid line.

In other embodiments, relaxing the at least one relaxable normal-order constraint can include removing the at least one relaxable normal-order constraint from the system of constraints.

In particular embodiments, solving the system of constraints can include solving the system of constraints using a variant of the Bellman-Ford algorithm.

At block 1270, the computing device can generate a display of at least some of the set of rectangular components based on the second locations of the grid lines.

In some embodiments, the display of at least some of the set of rectangular components can have at least one row with a negative height, where the at least one row having the negative height is associated with the at least one relaxed grid line. In particular embodiments, at least two rows in the display can overlap based on the negative height.

In other embodiments, the display of at least some of the set of rectangular components can have at least one column with a negative width, where the at least one column having the negative width is associated with the at least one relaxed grid line. In particular embodiments, at least two columns in the display can overlap based on the negative width.

At block 1280, the computing device can display the display.

Figure 13:
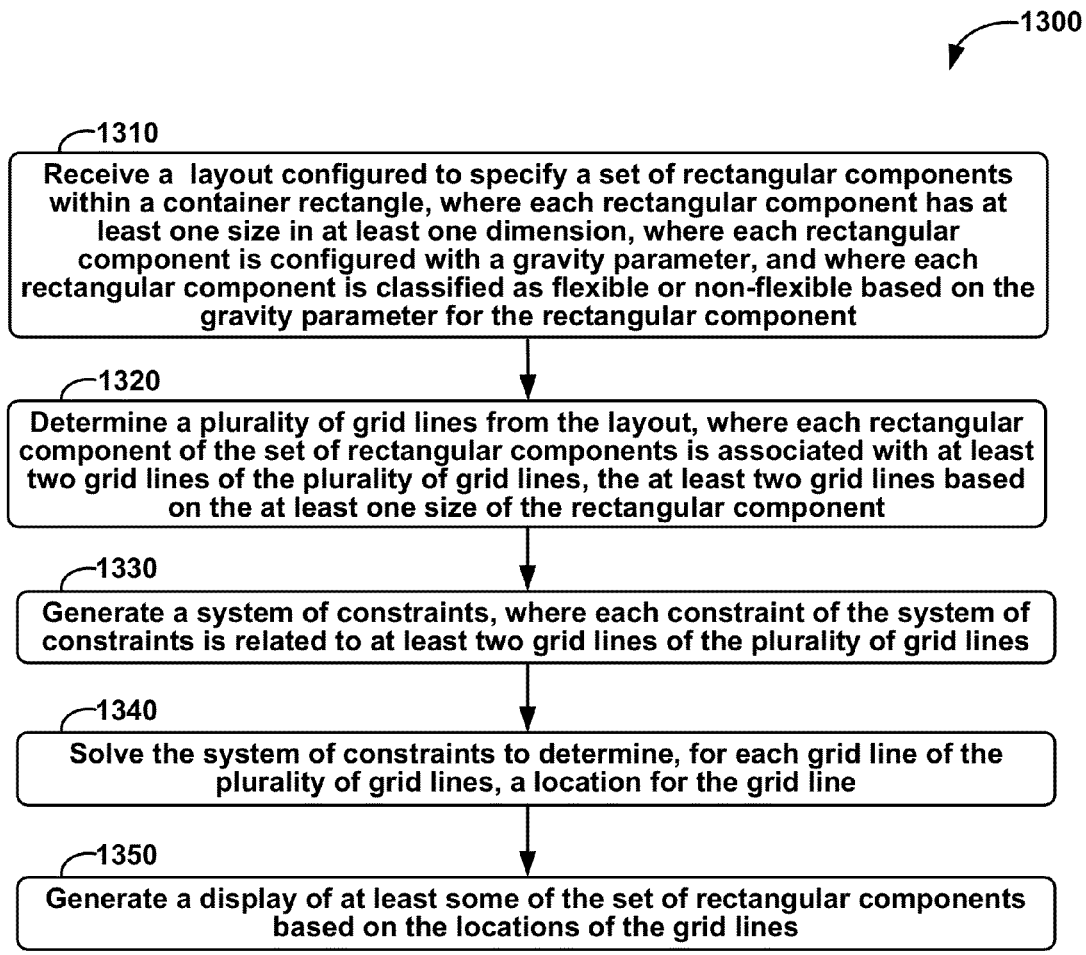
FIG. 13 is a flow chart of a method, in accordance with an example embodiment.

FIG. 13 is a flow chart of method 1300, in accordance with an example embodiment. Method 1300 begins at block 1310, where a layout can be received at a computing device. The layout can be configured to specify a set of rectangular components within a container rectangle. Each rectangular component can have a size in at least one dimension. Each rectangular component can be configured with a gravity parameter. Each rectangular component can be classified as flexible or non-flexible based on the gravity parameter for the rectangular component.

In some embodiments, the gravity parameter can be specified for at least one dimension, and the particular component can be classified as flexible in the at least one dimension.

In other embodiments, the gravity parameter can be unspecified in at least one dimension, and the particular component can be classified as non-flexible in the at least one dimension.

At block 1320, the computing device can determine a plurality of grid lines from the layout. Each rectangular component of the set of rectangular components can be associated with at least two grid lines of the plurality of grid lines. The at least two grid lines are based on the at least one size of the rectangular component;

At block 1330, the computing device can generate a system of constraints. Each respective constraint of the system of constraints can be related to at least two respective grid lines of the plurality of grid lines.

At block 1340, the computing device can solve the system of constraints to determine, for each grid line of the plurality of grid lines, a location for the grid line.

At block 1350, the computing device can generate a display of at least some of the set of rectangular components, based on the locations of the respective grid lines, a user-interface display of at least some of the set of rectangular components may be generated.

In some embodiments, the container rectangle can be divided into one or more columns. Each column of the one or more columns can be classified as flexible or non-flexible, and can have a width that is either negative or non-negative. A flexible column can be configured to have a width that is either negative or non-negative, and a non-flexible column can be configured to have only a non-negative width.

In particular embodiments, a subset of the set of rectangular components can be aligned in a particular column of the one or more columns. Each component in the subset of rectangular components can be classified as flexible, and the given column can be classified as flexible.

In other particular embodiments, a subset of the set of rectangular components can be aligned in a particular column of the one or more columns. At least one rectangular component in the subset of rectangular components can be classified as non-flexible, and the given column can be classified as non-flexible.

In some other particular embodiments, at least one column of the one or more columns can be classified as flexible. A particular flexible column of the at least one flexible column can have a negative width. At least some of the one or more columns can overlap on the display based on the particular flexible column.

In yet other embodiments, the container rectangle can be divided into one or more rows. Each row of the one or more rows can be classified as flexible or non-flexible, and can have a height that is either negative or non-negative. A flexible row can be configured to have a height that is either negative or non-negative, and a non-flexible row can be configured to have only a non-negative height.

In yet other particular embodiments, a subset of the set of rectangular components can be aligned in a particular row of the one or more rows. Each component in the subset of rectangular components can be classified as non-flexible, and the given row can be classified as non-flexible.

In still other particular embodiments, a subset of the set of rectangular components can be aligned in a particular row of the one or more rows. At least one rectangular component in the subset of rectangular components can be classified as flexible, and the given row can be classified as flexible.

In other particular embodiments, at least one row of the one or more rows can be classified as flexible. A particular flexible row of the at least one flexible row can have a negative height. At least some of the one or more rows can overlap on the display based on the particular flexible row.

Figure 14:
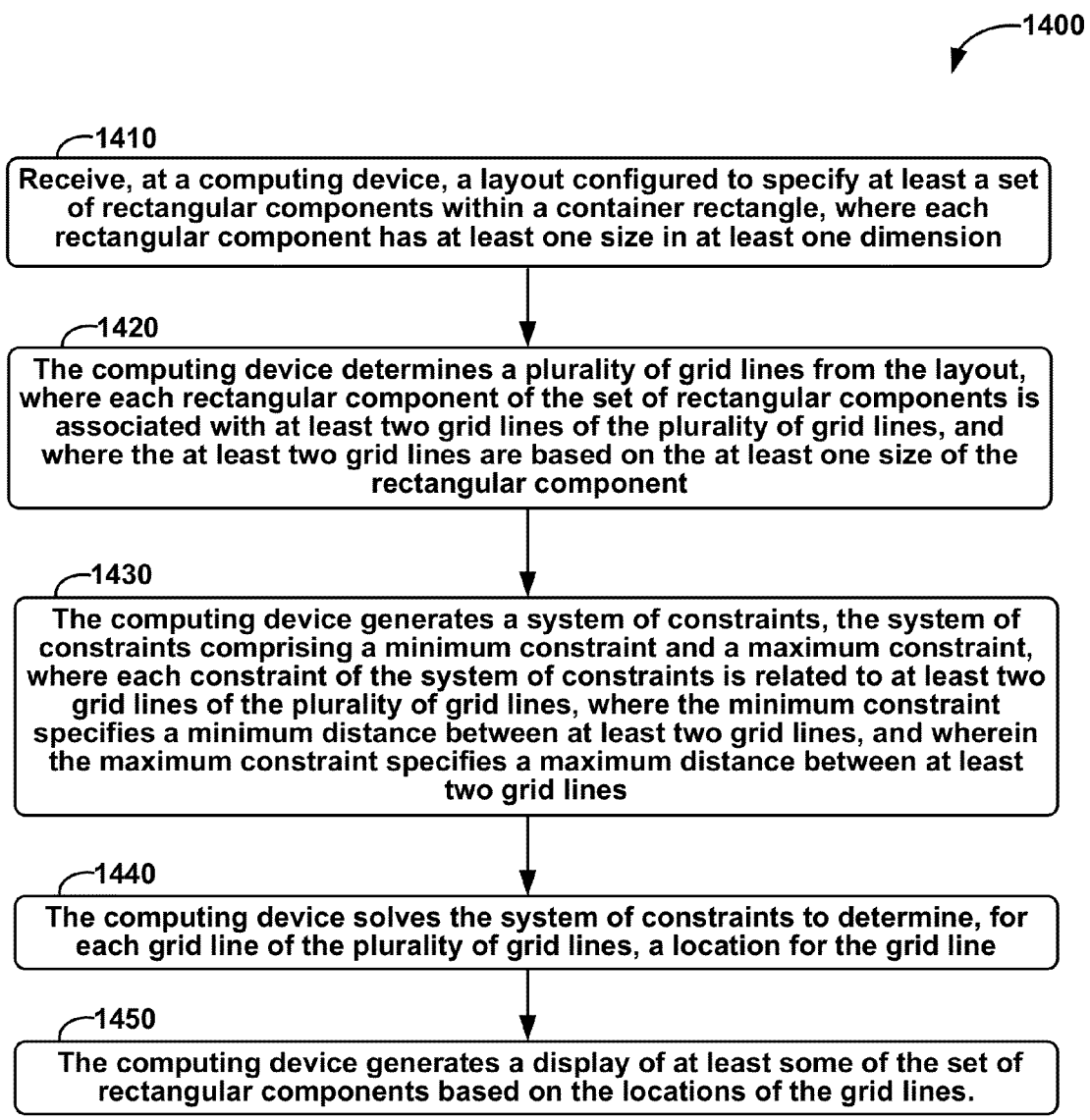
FIG. 14 is a flow chart of a method, in accordance with an example embodiment.

FIG. 14 is a flow chart of an example method 1400, in accordance with an example embodiment. Method 1400 begins at block 1410, where a layout can be received at a computing device. The layout can be configured to specify at least a set of rectangular components within a container rectangle. Each rectangular component can have at least one size in at least one dimension.

At block 1420, the computing device can determine a plurality of grid lines from the layout. Each rectangular component of the set of rectangular components can be associated with at least two grid lines of the plurality of grid lines. The at least two grid lines can be based on the at least one size of the rectangular component.

At block 1430, the computing device can generate a system of constraints. The system of constraints can include a minimum constraint and a maximum constraint. The minimum constraint can specify a minimum distance between two given grid lines, and the maximum constraint can specify a maximum distance between the two given grid lines.

In some embodiments, both the minimum and maximum constraints can be associated with a single rectangular component of the set of rectangular components. The single rectangular component can be associated with a first grid line of the plurality of grid lines and a second grid line of the plurality of grid lines. In particular embodiments, the minimum constraint can include a constraint on a minimum value for the single rectangular component, and the maximum constraint can include a constraint on a maximum value for the single rectangular component.

At block 1440, the computing device can solve the system of constraints to determine, for each grid line of the plurality of grid lines, a location for the respective grid line.

In some embodiments, solving the system of constraints can include: generating a graph including a plurality of nodes and a plurality of edges, where the plurality of nodes correspond to the plurality of grid lines, where the plurality of edges correspond to the system of constraints, where at least a minimum edge and a maximum edge of the plurality of edges are respectively associated with the minimum constraint and the maximum constraint of the system of constraints, and where the minimum edge has a first direction and the maximum edge has a second direction that differs from the first direction. In particular embodiments, a first node of the plurality of nodes corresponds to the first grid line, a second node of the plurality of nodes corresponds to the second grid line, the minimum edge is a forward edge from the first node to the second node, and the maximum edge is a backward edge from the second node to the first node.

In more particular embodiments, solving the system of constraints can include: (a) determining a first node weight for the first node, (b) determining a second node weight for the second node, and (c) determining a difference between the second node weight and the first node weight that is between the minimum value and the maximum value.

At block 1450, the computing device can generate a display of at least some of the set of rectangular components based on the locations of the grid lines.

In some embodiments, generating the display can include determining a first location based on the first node weight and a second location based on the second node weight. Then, the single rectangular component can be displayed in the display between the first location and the second location.

In some embodiments, method 1400 can include: separating the plurality of edges into at least a first portion of edges and a second portion of edges, where the minimum edge is in the first portion, where the maximum edge is in the second portion, where each edge in the first portion is in the first direction, and where each edge in the second portion is in the second direction.

In particular of these embodiments, method 1400 can further include: (a) sorting the first portion of edges, (b) sorting the second portion of edges separately from the first portion of edges, and (c) joining the first and second portions of edges. In more particular of these embodiments, method 1400 can further include: generating an ordering of the plurality of edges, where each edge in the first portion of edges precedes each edge in the second portion of edges, and where joining the first and second portions of edges includes joining the first and second portions of edges into a joined list of edges so that each edge in the first portion of the joined list precedes all edges of the second portion of edges in the joined list. In even more particular of these embodiments, solving the system of constraints can include solving the single-source path-length problem using a variant of the Bellman-Ford algorithm operating upon the joined list.

Figure 15:
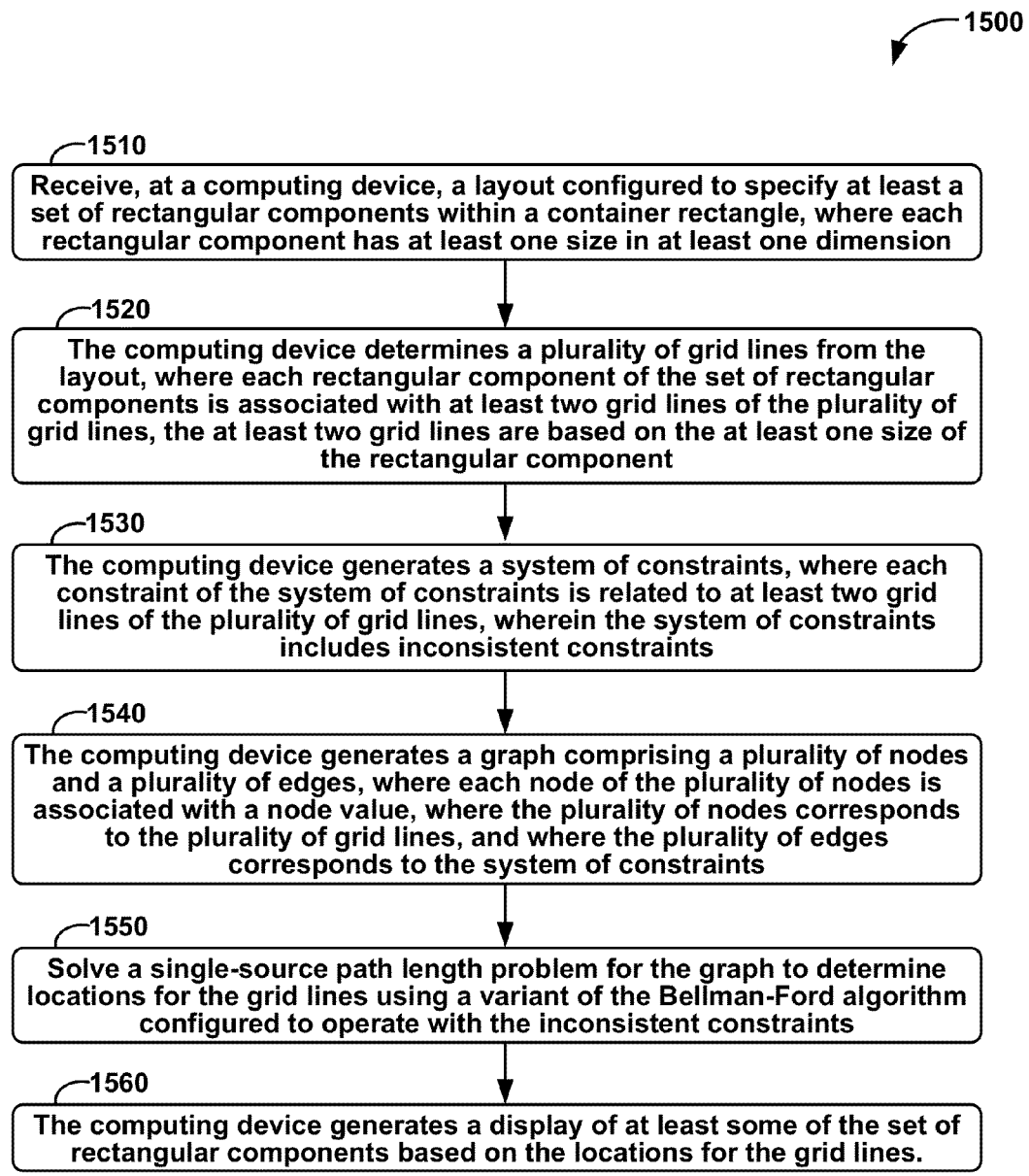
FIG. 15 is a flow chart of a method, in accordance with an example embodiment.

FIG. 15 is a flow chart of an example method 1500, in accordance with an example embodiment. Method 1500 begins at block 1510, where a layout can be received at a computing device. The layout can be configured to specify at least a set of rectangular components within a container rectangle. Each rectangular component can have at least one size in at least one dimension.

At block 1520, the computing device can determine a plurality of grid lines from the layout. Each rectangular component of the set of rectangular components can be associated with at least two grid lines of the plurality of grid lines. The at least two grid lines can be based on the at least one size of the rectangular component.

At block 1530, the computing device can generate a system of constraints. Each constraint of the system of constraints can be related to at least two grid lines of the plurality of grid lines. The system of constraints can include inconsistent constraints.

At block 1540, the computing device can generate a graph including a plurality of nodes and a plurality of edges. Each node of the plurality of nodes can be associated with a node value. The plurality of nodes can correspond to the plurality of grid lines. The plurality of edges can correspond to the system of constraints.

At block 1550, a single-source path-length problem for the graph can be solved to determine locations for the grid lines. The single-source path-length problem for the graph can be solved using a variant of the Bellman-Ford algorithm configured to operate with the inconsistent constraints.

In some embodiments, the variant of the Bellman-Ford algorithm is further configured to at least: (a) place the plurality of edges of the graph into an ordered list, where higher-priority edges precede lower-priority edges in the list, (b) initialize each node value for the plurality of nodes to a common value, (c) attempt to solve a single-source path-length problem on the graph; and (d) determine whether a successful outcome to the single-source path-length problem occurs. In particular of these embodiments, the variant of the Bellman-Ford algorithm can be exited in response to determining that the successful outcome does occur.

At block 1560, the computing device can generate a display of at least some of the set of respective rectangular components based on the locations for the grid lines.

In some embodiments, generating the display can include generating the display for display within a window, where the display has one or more display sizes, where the window has one or more window sizes, and where at least one display size of the one or more display sizes is greater than a corresponding at least one window size of the one or more window sizes. In particular of these embodiments, at least one of the inconsistent constraints corresponds to the at least one display size of the one or more display sizes that is greater than the corresponding at least one window size of the one or more window sizes.

In some embodiments, method 1500 can further include, in response to determining that the successful outcome does not occur: (a) associating a culprit value $C_i$ with each edge $E_i$ in the ordered list, the culprit value $C_i$ initially assigned to a logical false value; (b) attempting to solve the single-source path-length problem on the graph without reinitializing each node value for the plurality of nodes, and assigning a culprit value $C_i$ for an edge $E_i$ to a logical true value upon a determination that edge $E_i$ was used to update a node value for a node in the plurality of nodes, (c) finding a largest value LV for which the culprit value $C_{LV}$ is the logical true value, and (d) removing edge $E_{LV}$ from the ordered list.

In particular of these embodiments, method 1500 can further include: (e) initializing each node value for the plurality of nodes to the common value, (f) attempting to solve the single-source path-length problem on the graph with the edge $E_{LV}$ removed, (g) determining whether a successful outcome to the single-source path-length problem occurs on the graph with the edge $E_{LV}$ removed, and (h) in response to determining that the successful outcome to the single-source path-length problem occurs on the graph with the edge $E_{LV}$ removed, exiting the variant of the Bellman-Ford algorithm.

In other of these embodiments, method 1500 can further include: in response to removing edge $E_{LV}$ from the ordered list, generating a signal to a user interface. In other particular embodiments, the signal to the user interface can be configured to add one or more scroll bars to the user interface. In still other particular embodiments, the signal to the user interface can be configured to change a window size of the user interface.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A method, comprising:
   receiving, at a computing device, a layout configured to specify a set of rectangular components of a user-interface display within a container rectangle, wherein each rectangular component has at least one size in at least one dimension, wherein each rectangular component is configured with a gravity parameter, wherein each rectangular component is classified as flexible or non-flexible based on the gravity parameter for the rectangular component, wherein at least one rectangular component of the set of rectangular components is classified as flexible is configured to have either a negative size or non-negative size in one or more dimensions of the at least one dimension, and wherein each rectangular component classified as non-flexible is configured to have only a non-negative size in one or more dimensions of the at least one dimension;

the computing device determining a plurality of grid lines from the layout, wherein each rectangular component of the set of rectangular components is defined by at least two grid lines of the plurality of grid lines, the at least two grid lines based on the at least one size of the rectangular component;

the computing device generating a system of constraints, wherein each constraint of the system of constraints is related to at least two grid lines of the plurality of grid lines;

the computing device solving the system of constraints to determine, for each grid line in the plurality of grid lines, a location for the grid line; and the computing device generating the user-interface display with at least some of the set of rectangular components based on the locations of the grid lines.

2. The method of claim 1, wherein, for a particular component of the set of rectangular components, the gravity parameter is specified for at least one dimension, and wherein the particular component is classified as flexible in the at least one dimension.

3. The method of claim 1, wherein, for a particular component of the set of rectangular components, the gravity parameter is unspecified in at least one dimension, and wherein the particular component is classified as non-flexible in the at least one dimension.

4. The method of claim 1, wherein the container rectangle is divided into one or more columns, wherein each column of the one or more columns is classified as flexible or non-flexible and has a width, wherein a flexible column is configured to have a width that is either negative or non-negative, and wherein a non-flexible column is configured to have only a non-negative width.

5. The method of claim 4, wherein a subset of the set of rectangular components are aligned in a particular column of the one or more columns, wherein each component in the subset of rectangular components is classified as flexible, and wherein the particular column is classified as flexible.

6. The method of claim 4, wherein, a subset of the set of rectangular components are aligned in a particular column of the one or more columns, wherein at least one component in the subset of rectangular components is classified as non-flexible, and wherein the particular column is classified as non-flexible.

7. The method of claim 4, wherein at least one column of the one or more columns is classified as flexible, wherein a particular flexible column of the at least one flexible column has a negative width, and wherein at least some of the one or more columns overlap on the display based on the particular flexible column.

8. The method of claim 1, wherein the container rectangle is divided into one or more rows, wherein each row of the one or more rows is classified as flexible or non-flexible and has a height, wherein a flexible row is configured to have a height that is either negative or non-negative height, and wherein a non-flexible row is configured to have only a non-negative height.

9. The method of claim 8, wherein a subset of the set of rectangular components are aligned in a particular row of the one or more rows, wherein each component in the subset of rectangular components is classified as non-flexible, and wherein the particular row is classified as non-flexible.

10. The method of claim 8, wherein a subset of the set of rectangular components are aligned in a particular row of the one or more rows, wherein at least one component in the subset of rectangular components is classified as flexible, and wherein the particular row is classified as flexible.

11. The method of claim 1, wherein at least one constraint of the system of constraints comprises an inequality associated with at least two grid lines and corresponding to one rectangular component.

12. The method of claim 1, wherein solving the system of constraints comprises solving the system of constraints using a variant of the Bellman-Ford algorithm.

13. A computing device, comprising:

a processor; and data storage, configured to store at least computer-readable program instructions, wherein the instructions are configured to, upon execution by the processor, cause the computing device to perform functions comprising:

receiving a layout configured to specify a set of rectangular components of a user-interface display within a container rectangle, wherein each rectangular component has at least one size in at least one dimension, wherein each rectangular component is configured with a gravity parameter, wherein each rectangular component is classified as flexible or non-flexible based on the gravity parameter for the rectangular component, wherein at least one rectangular component of the set of rectangular components is classified as flexible is configured to have either a negative size or non-negative size in one or more dimensions of the at least one dimension, and wherein a rectangular component classified as non-flexible is configured to have only a non-negative size in one or more dimensions of the at least one dimension, determining a plurality of grid lines from the layout, wherein each rectangular component of the set of rectangular components is defined by at least two grid lines of the plurality of grid lines, the at least two grid lines based on the at least one size of the rectangular component, generating a system of constraints, wherein each constraint of the system of constraints is related to at least two grid lines of the plurality of grid lines, solving the system of constraints to determine, for each grid line in the plurality of grid lines, a location for the grid line, and generating the user-interface display with at least some of the set of rectangular components based on the locations of the grid lines.

14. The computing device of claim 13, wherein, for a particular component of the set of rectangular components, the gravity parameter is specified for at least one dimension, and wherein the particular component is classified as flexible in the at least one dimension.

15. The computing device of claim 13, wherein, for a particular component of the set of rectangular components, the gravity parameter is unspecified in at least one dimension, and wherein the particular component is classified as non-flexible in the at least one dimension.

16. The computing device of claim 13, wherein the container rectangle is divided into one or more columns, wherein each column of the one or more columns is classified as flexible or non-flexible and has a width, wherein a flexible column is configured to have a width that is either negative or non-negative, and wherein a non-flexible column is configured to have only a non-negative width.

17. The computing device of claim 16, wherein a subset of the set of rectangular components are aligned in a particular column of the one or more columns, wherein each component in the subset of rectangular components is classified as flexible, and wherein the particular column is classified as flexible.

18. The computing device of claim 16, wherein, a subset of the set of rectangular components are aligned in a particular column of the one or more columns, wherein at least one component in the subset of rectangular components is classified as non-flexible, and wherein the particular column is classified as non-flexible.

19. The computing device of claim 16, wherein at least one column of the one or more columns is classified as flexible, wherein a particular flexible column of the at least one flexible column has a negative width, and wherein at least some of the one or more columns overlap on the display based on the particular flexible column.

20. The computing device of claim 13, wherein the container rectangle is divided into one or more rows, wherein each row of the one or more rows is classified as flexible or non-flexible and has a height, wherein a flexible row is configured to have a height that is either negative or non-negative height, and wherein a non-flexible row is configured to have only a non-negative height.

21. The computing device of claim 20, wherein a subset of the set of rectangular components are aligned in a particular row of the one or more rows, wherein each component in the subset of rectangular components is classified as non-flexible, and wherein the particular row is classified as non-flexible.

22. The computing device of claim 21, wherein a subset of the set of rectangular components are aligned in a particular row of the one or more rows, wherein at least one component in the subset of rectangular components is classified as flexible, and wherein the particular row is classified as flexible.

23. The computing device of claim 13, wherein solving the system of constraints comprises solving the system of constraints using a variant of the Bellman-Ford algorithm.

24. An article of manufacture including a non-transitory computer-readable storage medium having instructions stored thereon that, in response to execution by a computing device, cause the computing device to perform functions comprising:
receiving a layout configured to specify a set of rectangular components of a user-interface display within a container rectangle, wherein each rectangular component has at least one size in at least one dimension, wherein each rectangular component is configured with a gravity parameter, and wherein each rectangular component is classified as flexible or non-flexible based on the gravity parameter for the rectangular component, wherein at least one rectangular component classified as flexible is configured to have either a negative size or non-negative size in one or more dimensions of the at least one dimension, and wherein a rectangular component classified as non-flexible is configured to have only a non-negative size in one or more dimensions of the at least one dimension;
determining a plurality of grid lines from the layout, wherein each rectangular component of the set of rectangular components is defined by at least two grid lines of the plurality of grid lines, the at least two grid lines based on the at least one size of the rectangular component;
generating a system of constraints, wherein each constraint of the system of constraints is related to at least two grid lines of the plurality of grid lines;
solving the system of constraints to determine, for each grid line in the plurality of grid lines, a location for the grid line; and
generating the user-interface display with at least some of the set of rectangular components based on the locations of the grid lines.

25. The article of manufacture of claim 24, wherein, for a particular component of the set of rectangular components, the gravity parameter is specified for at least one dimension, and wherein the particular component is classified as flexible in the at least one dimension.

26. The article of manufacture of claim 24, wherein, for a particular component of the set of rectangular components, the gravity parameter is unspecified in at least one dimension, and wherein the particular component is classified as non-flexible in the at least one dimension.

27. The article of manufacture of claim 24, wherein the container rectangle is divided into one or more columns, wherein each column of the one or more columns is classified as flexible or non-flexible and has a width, wherein a flexible column is configured to have a width that is either negative or non-negative, and wherein a non-flexible column is configured to have only a non-negative width.

28. The article of manufacture of claim 27, wherein at least one column of the one or more columns is classified as flexible, wherein a particular flexible column of the at least one flexible column has a negative width, and wherein at least some of the one or more columns overlap on the display based on the particular flexible column.

29. The article of manufacture of claim 24, wherein the container rectangle is divided into one or more rows, wherein each row of the one or more rows is classified as flexible or non-flexible and has a height, wherein a flexible row is configured to have a height that is either negative or non-negative height, and wherein a non-flexible row is configured to have only a non-negative height.

30. The article of manufacture of claim 24, wherein solving the system of constraints comprises solving the system of constraints using a variant of the Bellman-Ford algorithm.

* * * * *